(12) United States Patent
Wick et al.

(10) Patent No.: US 7,330,338 B1
(45) Date of Patent: Feb. 12, 2008

(54) METHOD FOR ADJUSTING PITCH AND ROLL IN A HEAD SUSPENSION

(75) Inventors: Thomas H. Wick, Stewart, MN (US); Mark S. Hedeen, Hutchinson, MN (US); Jeremy J. Stroschein, Waconia, MN (US); John L. Schumann, Litchfield, MN (US); Justin M. Eggert, Dassel, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 584 days.

(21) Appl. No.: 10/839,492

(22) Filed: May 5, 2004

(51) Int. Cl.
  *G11B 5/48* (2006.01)
  *G11B 5/127* (2006.01)
  *G11B 21/16* (2006.01)
  *H04R 31/00* (2006.01)

(52) U.S. Cl. ............... 360/245.7; 360/245.8; 360/245.9; 360/235.8; 360/235.9; 29/603.01; 29/603.12

(58) Field of Classification Search .. 360/245.7–245.9, 360/235.8–235.9; 29/603.01, 603.12, 402.21; 700/279
See application file for complete search history.

(56) References Cited

U.S. PATENT DOCUMENTS

| | | | |
|---|---|---|---|
| 4,603,567 A * | 8/1986 | Smith et al. ................. | 72/16.9 |
| 4,866,836 A * | 9/1989 | Von Brandt et al. ..... | 29/603.06 |
| 4,962,654 A | 10/1990 | Zbornik | |
| 5,297,413 A * | 3/1994 | Schones et al. ............ | 72/342.1 |
| 5,299,081 A * | 3/1994 | Hatch et al. .............. | 360/244.2 |
| 5,444,587 A * | 8/1995 | Johnson et al. .......... | 360/245.2 |
| 5,608,590 A | 3/1997 | Ziegler et al. | |
| 5,617,274 A * | 4/1997 | Ruiz ....................... | 360/245.5 |
| 5,657,531 A * | 8/1997 | Sato et al. ................ | 29/603.04 |
| 5,682,780 A | 11/1997 | Girard | |
| 5,687,597 A * | 11/1997 | Girard ........................ | 72/21.4 |
| 5,712,463 A * | 1/1998 | Singh et al. .............. | 219/121.6 |
| 5,729,889 A | 3/1998 | Goss | |
| 5,787,570 A * | 8/1998 | Ressmeyer et al. ...... | 29/603.09 |
| 5,802,701 A * | 9/1998 | Fontana et al. .......... | 29/603.14 |
| 5,832,763 A * | 11/1998 | Girard ........................ | 72/16.3 |
| 5,832,764 A | 11/1998 | Girard | |
| 5,842,270 A | 12/1998 | Tucker et al. | |
| 5,850,320 A * | 12/1998 | Warmka et al. .......... | 360/245.2 |
| 5,873,159 A * | 2/1999 | Arya et al. ............... | 29/603.03 |
| 5,886,857 A * | 3/1999 | Symons et al. .......... | 360/245.2 |
| 5,901,430 A * | 5/1999 | Ziegler et al. ........... | 29/603.06 |

(Continued)

FOREIGN PATENT DOCUMENTS

JP          2000306224 A   *  11/2000

(Continued)

Primary Examiner—Angel Castro
Assistant Examiner—Christopher R. Magee
(74) Attorney, Agent, or Firm—Faegre & Benson LLP

(57) ABSTRACT

Apparatus and method for adjusting at least one of a pitch and roll parameter of a gimbal for a head suspension assembly having a pair of members contacting at least one gimbal arm at spaced apart locations and having an additional member contacting the gimbal arm intermediate the spaced apart locations and wherein the members move together to cause plastic deformation of the gimbal arm. A like apparatus and method may be used sequentially or concurrently on a second gimbal arm, and may have an inverted orientation with respect to the first apparatus.

12 Claims, 26 Drawing Sheets

U.S. PATENT DOCUMENTS

| | | | |
|---|---|---|---|
| 5,912,788 A * | 6/1999 | Blaeser et al. | 360/245.5 |
| 5,943,761 A | 8/1999 | Tucker et al. | |
| 5,946,167 A * | 8/1999 | Hara et al. | 360/322 |
| 5,956,212 A | 9/1999 | Zhu | |
| 5,970,602 A * | 10/1999 | Harada et al. | 29/603.06 |
| 5,987,733 A * | 11/1999 | Goss | 29/603.03 |
| 6,011,239 A * | 1/2000 | Singh et al. | 219/121.6 |
| 6,032,352 A * | 3/2000 | Furay et al. | 29/603.03 |
| 6,052,258 A * | 4/2000 | Albrecht et al. | 360/245.2 |
| 6,055,133 A * | 4/2000 | Albrecht et al. | 360/245.2 |
| 6,073,337 A * | 6/2000 | Strom | 29/603.12 |
| 6,098,435 A * | 8/2000 | Takada | 72/31.11 |
| 6,108,172 A * | 8/2000 | Hagen | 360/245.2 |
| 6,128,164 A | 10/2000 | Kant et al. | 360/244.5 |
| 6,134,770 A * | 10/2000 | Heeren et al. | 29/603.03 |
| 6,141,868 A * | 11/2000 | Schmidt et al. | 29/757 |
| 6,145,188 A * | 11/2000 | Brooks et al. | 29/603.03 |
| 6,163,953 A * | 12/2000 | Shiraishi et al. | 29/603.03 |
| 6,166,886 A * | 12/2000 | Toensing | 360/244.5 |
| 6,172,853 B1 * | 1/2001 | Davis et al. | 360/245.7 |
| 6,173,485 B1 * | 1/2001 | Shiraishi et al. | 29/603.06 |
| 6,202,888 B1 * | 3/2001 | Pollock et al. | 221/1 |
| 6,215,625 B1 * | 4/2001 | Carlson | 360/244.7 |
| 6,219,203 B1 * | 4/2001 | Arya et al. | 360/244.2 |
| 6,823,581 B2 | 11/2004 | Kidachi et al. | |
| 2002/0135926 A1 | 9/2002 | Girard et al. | |
| 2002/0171970 A1 | 11/2002 | Girard et al. | |
| 2003/0154005 A1 | 8/2003 | Wong et al. | |
| 2003/0188420 A1 | 10/2003 | Wong et al. | |

FOREIGN PATENT DOCUMENTS

JP        2000322854  A  *  11/2000

* cited by examiner

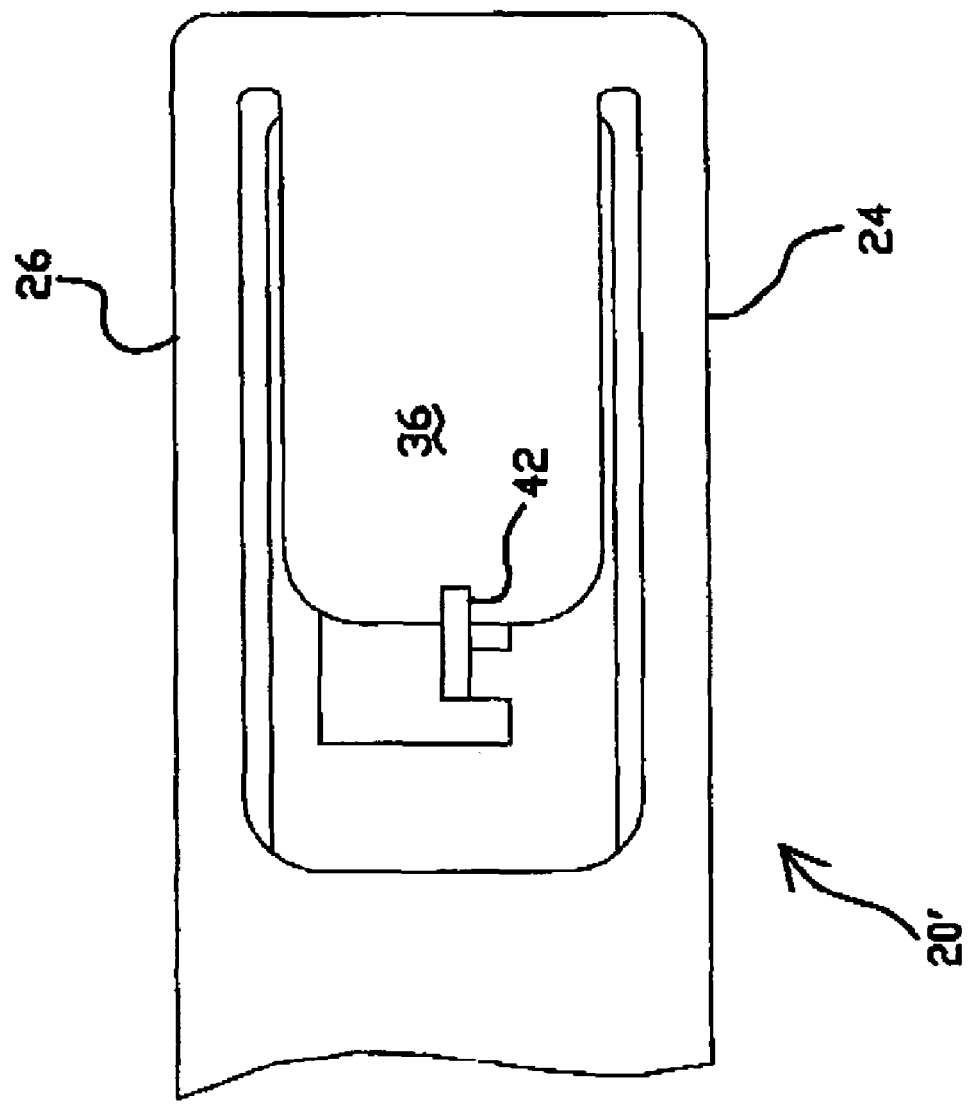

METHOD FOR ADJUSTING PITCH AND ROLL IN A HEAD SUSPENSION

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force (often referred to as "gram load") of the head suspension, thus positioning the head slider at a desired height and alignment above the disk which is referred to as the "fly height."

A load beam is typically used to support the head slider via a gimbal region of a flexure mounted to the load beam, with the load beam including a mounting region at a proximal end, a rigid region at a distal end, and a spring region between the rigid region and the mounting region for providing the spring force creating the gram load. Head suspensions are normally combined with an actuator arm or E-block to which the mounting region at the proximal end of the load beam is mounted with a base plate so as to position (by linear or rotary movement) the head suspension, and thus the head slider, with respect to data tracks of the rigid disk. An alternative mounting arrangement (with which the present invention may be used) omits the base plate in a Unamount type mounting, available from Hutchinson Technology Inc. of Hutchinson, Minn., the assignee of the present invention.

The flexure typically includes the gimbal region having a slider bond pad to which the head slider is attached. The flexure provides a resilient connection between the slider and the load beam, and permits pitch and roll motion of the head slider as it moves over the disk in response to fluctuations in the air bearing caused by fluctuations in the surface of the rigid disk. Head suspension flexures can be provided in numerous ways, including designs in which the load beam and flexure are formed integrally with one another (a two-piece design comprising the base plate and the integral load beam/flexure) and designs in which the flexure is a separate piece from the load beam (a three-piece design comprising the base plate, the load beam and the separate flexure). Another form of head suspension with which the present invention may be used is a four piece design including a load beam, flexure, base plate, and hinge piece or spring layer.

One three-piece design includes a flexure having a resilient tongue and two resilient spring arms or gimbal arms. The head slider is supported on the resilient tongue (i.e. the slider bond pad), which is in turn supported by the spring arms (not to be confused with the spring region at the proximal or mounting end of the load beam). The spring arms are connected to a flexure mounting region, which is in turn connected to the load beam. The gram load provided by the spring region of the load beam is transferred to the flexure via a dimple contact that (typically) is located between the rigid region of the load beam and the flexure. Alternatives to the dimple (with which the present invention may be used) includes an etched tower or a ball made of suitable material such as glass. As used herein, the term "dimple contact" refers to any of these alternatives or other alternatives that provide the locating and pivoting function provided by the dimple. The spring arms allow the tongue of the flexure to gimbal (or rotate) in pitch and roll directions to accommodate surface variations in the spinning magnetic disk over which the slider is flying. The spring arms also force a return of the gimbal to a nominal position in the absence of external forces. The roll axis about which the head slider gimbals is a central longitudinal axis of the head suspension. The pitch axis about which the head slider gimbals is perpendicular to the roll axis. That is, the pitch axis is transverse to the longitudinal axis of the load beam, and crosses the roll axis at or around the head slider.

When the head suspension is not actually flying over a spinning disk in a "dynamic attitude," the loaded state of the head suspension can be simulated by applying a force in the same direction as the air bearing force at a point on the head suspension other than on the slider bond pad where the head slider would be attached (or, if the slider is attached, other than to the head slider). This force is applied to lift the slider bond pad to its loaded position at the fly height. The orientation or attitude of the slider bond pad under this simulated loaded state is referred to as "static attitude." The difference or bias between the dynamic attitude and the static attitude can be measured for a given head suspension so that a measurement of the static attitude, which can be an easier measurement to make than dynamic attitude, can be used to determine dynamic attitude for a given head suspension. In other words, a head suspension typically has a predetermined static attitude that can be used to assess the dynamic attitude of a head slider attached to the head suspension during normal operation of a disk drive.

Static attitude of a head slider bond pad can be measured with reference to pitch and roll axes of the head suspension. It has been found desirable to adjust the static attitude of a head suspension from a nominal orientation to impart a desired pitch and/or roll bias into the head suspension. In so far as these biases represent incremental changes in pitch and roll static attitude imparted to the head suspension, these too can be viewed as pitch and roll corrections, and the differences between nominal and desired attitude can be referred to as pitch and roll errors.

Because of the importance of correct head slider attitude, various methods exist for correcting pitch and roll errors to obtain appropriate static attitude. Such methods are disclosed in, for example, U.S. Pat. No. 5,682,780, issued Nov. 4, 1997 to Girard for "Gram Load, Static Attitude And Radius Geometry Adjusting System For Magnetic Head Suspensions"; U.S. Pat. No. 5,608,590, issued Mar. 4, 1997 for "Gimballing Flexure With Static Compensation And Load Point Integral Etched Features"; and U.S. Pat. No. 5,729,889 issued Mar. 24, 1998 for "Method Of Mounting a Head Slider To a Head Suspension With Static Offset Compensation"; and U.S. Pat. No. 5,832,764, issued Nov. 10, 1998 to Girard for "Method for Adjusting Gram Load, Static Attitude And Radius Geometry For Magnetic Head Suspensions." Each of these patents is commonly owned by the assignee of the present application and each is fully incorporated herein by reference for all purposes.

One method of correcting errors in the static attitude involves mechanically twisting and/or bending the head suspension to alter the profile of the load beam. In such a method, the profile of the load beam can be altered to support the flexure at an attitude to the disk surface that compensates for any errors in the static attitude of the head suspension. That is, the load beam can be bent about an axis perpendicular to the longitudinal axis of the load beam to account for pitch errors in the static attitude of the head suspension. The load beam can also be twisted about its longitudinal axis to account for roll errors in the static attitude. Adjusting the head suspension in these ways, however, can negatively affect other head suspension parameters, such as the fly height, gram load, and overall resonance profile of the head suspension. In particular, bending the head suspension to affect pitch static attitude also affects gram load, resonance, and head lift height, while twisting the head suspension to correct roll static attitude affects head suspension resonance and introduces vibratory motion in the off-track direction, which can negatively impact disk drive performance. Such mechanical adjustments can also be undesirable due to the amount of forming required to get an appropriate adjustment in static attitude.

As disk drives are designed having smaller disks, closer spacing, and increased storage densities, smaller and thinner head suspensions are required. These smaller and narrower head suspensions are susceptible to damage if the disk drive is subjected to a shock load or if the suspension experiences excessive pitch and roll motion. Moreover, as the use of portable personal computers increases, it is more likely that head suspensions in these portable computers will be subjected to shock loads. Thus, it is becoming increasingly important to design the head suspension so that it is less susceptible to excessive movements caused by shock loads and by pitch and roll motion, while still maintaining the necessary freedom of movement in the pitch and roll directions. In this manner, damaging contact between the head slider and the disk surface and permanent deformation of components of the head suspension can be prevented.

Mechanisms, referred to herein as "limiters" have been developed for limiting the movement of a free end of a cantilever portion of a flexure for protection against damage under shock loads. Limiters can be located proximal or distal of the gimbal portion of the head suspension, or at any location in between. While the limiters provide valuable protection against damage, they can also restrict or prevent adequate range of movement for pitch and roll adjustment of the head suspension, because of the restriction on movement permitted by the limiters. It is to be understood that the present invention may be practiced without impairing the operation of limiters when present in the suspension being adjusted.

The present invention relates to adjustment of pitch and roll parameters for head suspensions with limiters useful in disk drive applications, particularly head suspensions which have limiters which provide a limited range of movement of a gimbal on which a head slider is mounted. The present invention may be used with designs which use multiple (e.g., leading and trailing) limiters. It is, of course, known that the size of head suspensions is continually being reduced. The combination of reduced size with multiple limiters presents difficulty in using prior art approaches for the adjustment of pitch and roll parameters for the gimbal. In one prior art approach, a pair of pins were used to adjust pitch, however with reduced size dual limiter designs, this prior art approach sometimes caused unhooked or damaged or deformed limiters and sometimes was not feasible simply because of space constraints.

The present invention overcomes shortcomings of the prior art by providing apparatus and method to adjust pitch and roll of the gimbal arms in a head suspension using three elements mechanically contacting one gimbal arm with the two elements on one side of the arm and the third element on the other side of the arm.

Determining the amount of adjustment necessary to correct the pitch and/or roll errors can be accomplished by referencing stored adjustment data describing the relationship between the amount of correction obtained for a given deformation using the present invention. In one aspect, the amount of adjustment needed is first determined, and the amount of deformation necessary to compensate for pitch error and/or roll error is predicted using statistical analysis. The prediction can be made by consulting stored adjustment data describing the relationship between the results achieved based on the amount of deformation. A response factor may be calculated for static attitude parameter adjustment. The response factor is a ratio between the resulting (estimated) deformation for the amount of actual deformation imposed on the spring arm or arms. The amount of actual deformation can be upwardly or downwardly adjusted based upon the actual results obtained using the response factor.

In another aspect, a model of the relationship between changes in a given static attitude parameter and the associated amount or extent of bending required may be stored in a computer. After the then-current parameter of the suspension is measured, the computer calculates the required correction (i.e., the difference between the measured and desired parameter values). The computer then accesses the model as a function of the required correction to determine the amount of actual adjustment needed to achieve the correction. Once the actual adjustment has been made, the parameter value may again be measured and used to update the model. Measured data from a given number of the most recently executed adjustments may be used to recompute the model.

BRIEF DESCRIPTION OF THE DRAWINGS

FIG. 3 is a plan view similar to that of FIG. 1A except showing another version having a single limiter proximal of the gimbal.

DETAILED DESCRIPTION OF THE INVENTION

Figure 1:
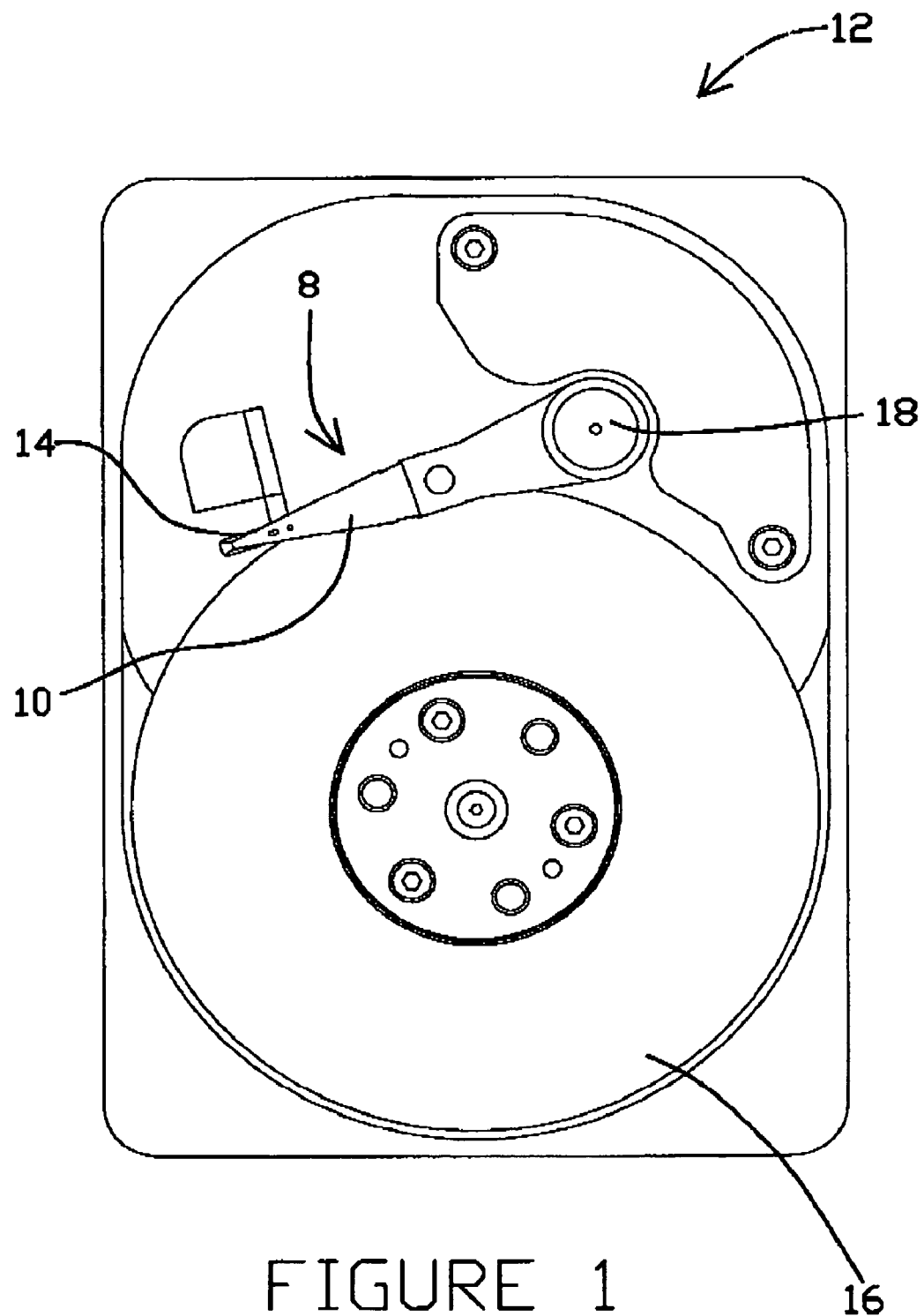
FIG. 1 is a top plan view of a hard disk drive including a head suspension assembly.

FIG. 1 schematically illustrates a rigid disk drive 12 that includes a head suspension assembly 8. Head suspension assembly 8 has a load beam 10 that resiliently supports a head slider 14 at a fly height above a rigid disk 16 during operation, as described above. Head suspension assembly 8 is connected to a rotary actuator 18, as is known, for accessing data tracks provided on the surface of the rigid disk 16. Head suspension assembly 8 could otherwise be utilized with a linear type actuator, as is also well known.

Figure 1A:
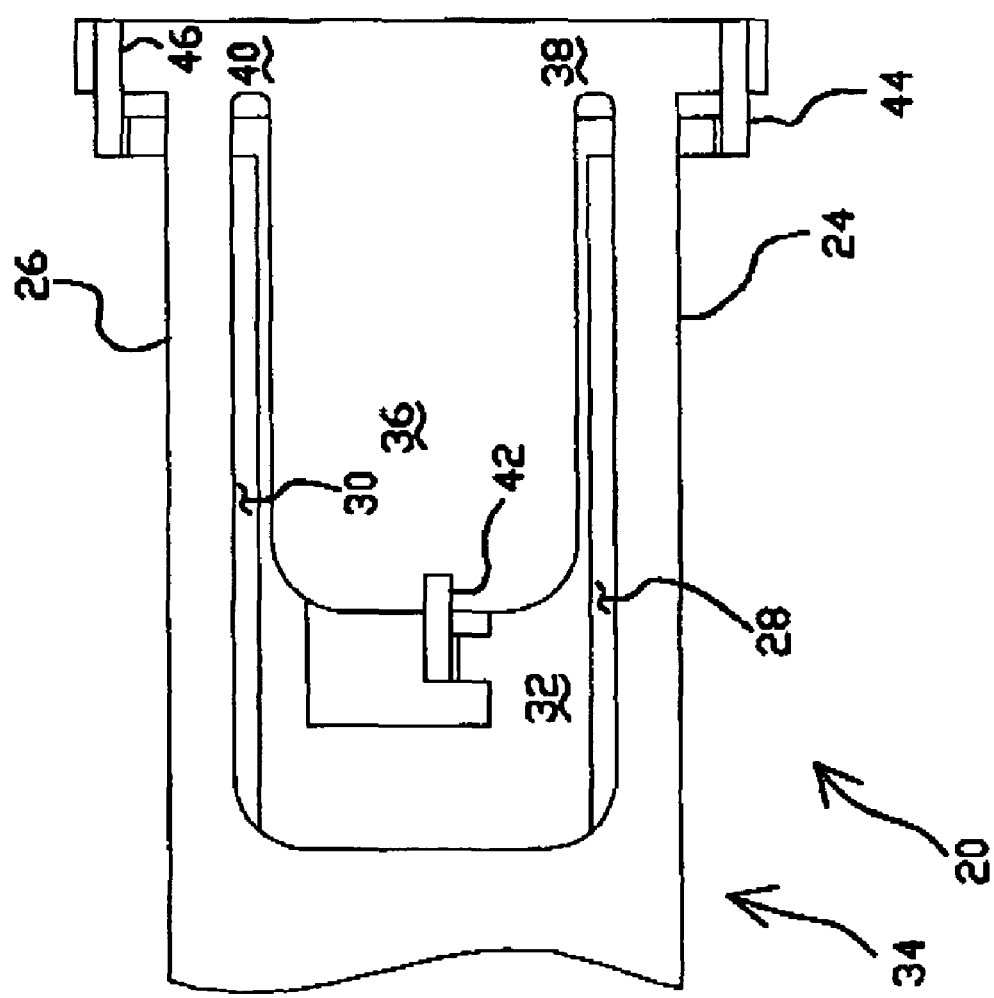
FIG. 1A is a fragmentary plan view of a gimbal region of a first version of a head suspension assembly having multiple limiters useful in the practice of the present invention.
Figure 2:
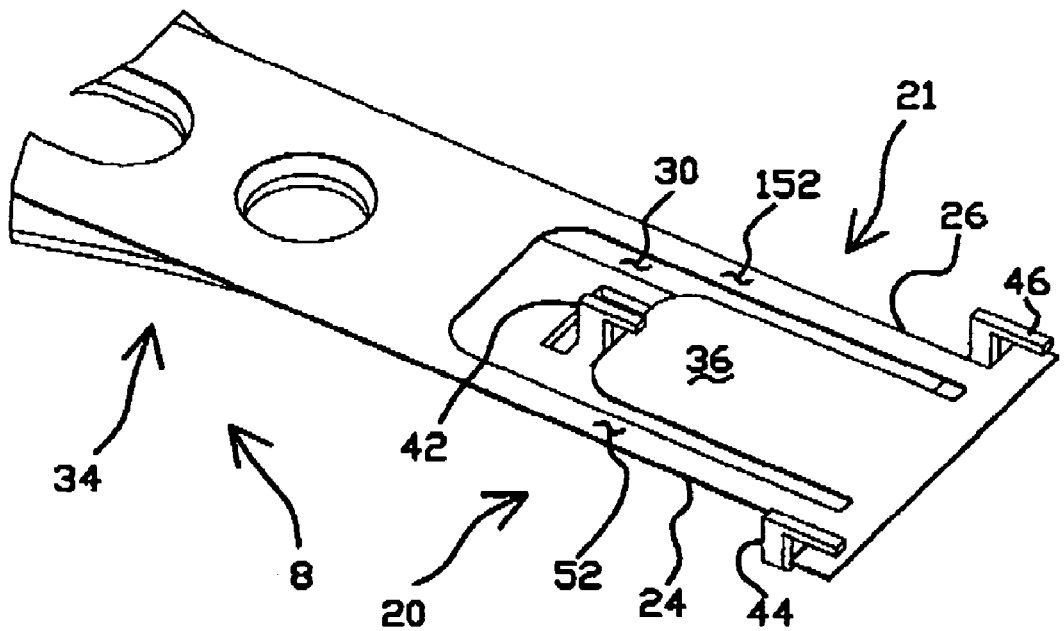
FIG. 2 is a perspective view corresponding to FIG. 1A.

Referring now to the remaining Figures, and most particularly, to FIGS. 1A and 2, a simplified view of a gimbal portion 20 of the head suspension assembly 8 may be seen. In the head suspension shown, the gimbal portion 20 is supported by a first gimbal arm 24 on one lateral side and by a second gimbal arm 26 on the other lateral side of the suspension. Each gimbal arm extends along its respective lateral side, spaced by respective gaps 28, 30 from a supporting structure 32 of the head suspension. Each gimbal arm 24, 26 is connected to or at least in contact with a proximal portion 34 of the suspension 8 and is connected to a gimbal tongue 36 via respective bridge portions 38, 40. In the manufacture of such head suspensions, it is desirable to be able to adjust the roll and pitch parameters of the static attitude of the gimbal portion 20. However, certain designs of head suspensions, such as that shown in FIGS. 1A and 2, may have one, two, or more limiters 42, 44, and 46 to limit the amount of motion of the gimbal portion with respect to the remainder of the head suspension. Because the limiters for the gimbal portion extend from the support structure 32 and are interleaved with the gimbal portion 20 of the head suspension, the amount by which the gimbal portion can be moved to be plastically deformed to adjust one or both of the roll or pitch parameters is constrained by the range of movement of the gimbal permitted by the limiter or limiters. Nevertheless, the present invention may be practiced without impairing the operation of the limiter or limiters.

Figure 2A:
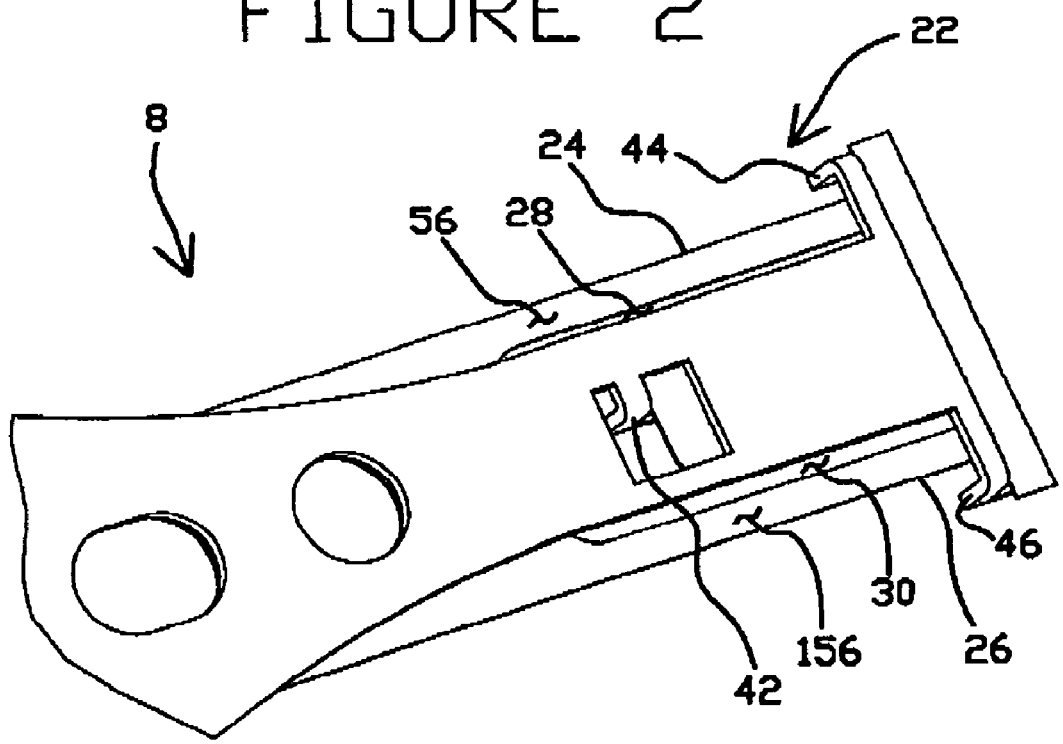
FIG. 2A is a perspective view from the opposite side of the apparatus of FIG. 2.

FIG. 2 shows a first side 21 of gimbal 20, while FIG. 2A shows a second or obverse side 22 of gimbal 20. Each of arms 24, 26 has a first side 52, 152 on the one side of the suspension 8 (as shown, the same side of the head suspension 8 as first side 21 of gimbal 20); similarly, each of arms 24, 26 has a second side 56, 156 on the opposite side of suspension 8 (shown in FIG. 2A as side 22 of gimbal 20). It is to be understood, however that the "first" and "second" sides of the arms may be associated respectively with the opposite sides of the gimbal while still remaining within the present invention, and that the terms "first" and "second" as used herein are merely for convenience in describing relative relationships.

Figure 4:
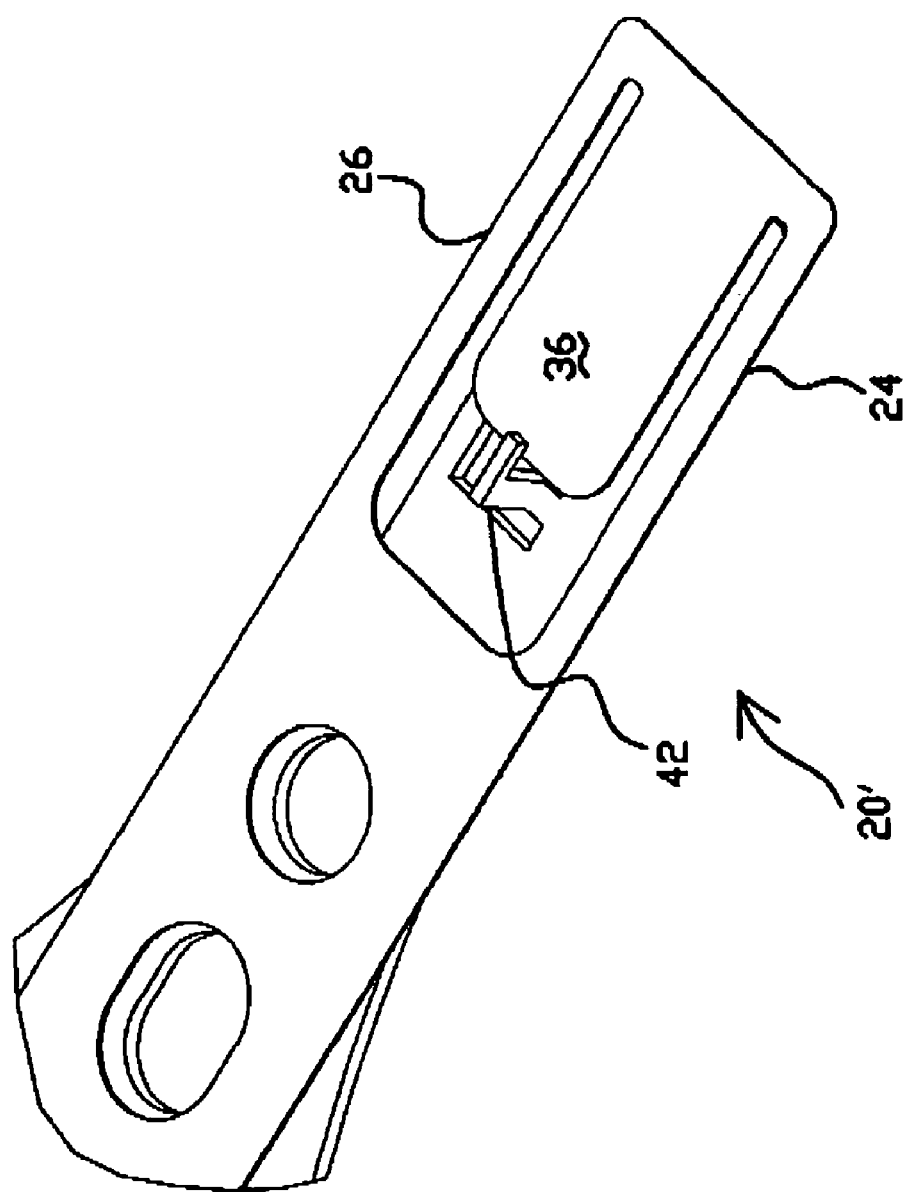
FIG. 4 is a perspective view corresponding to FIG. 3.
Figure 5:
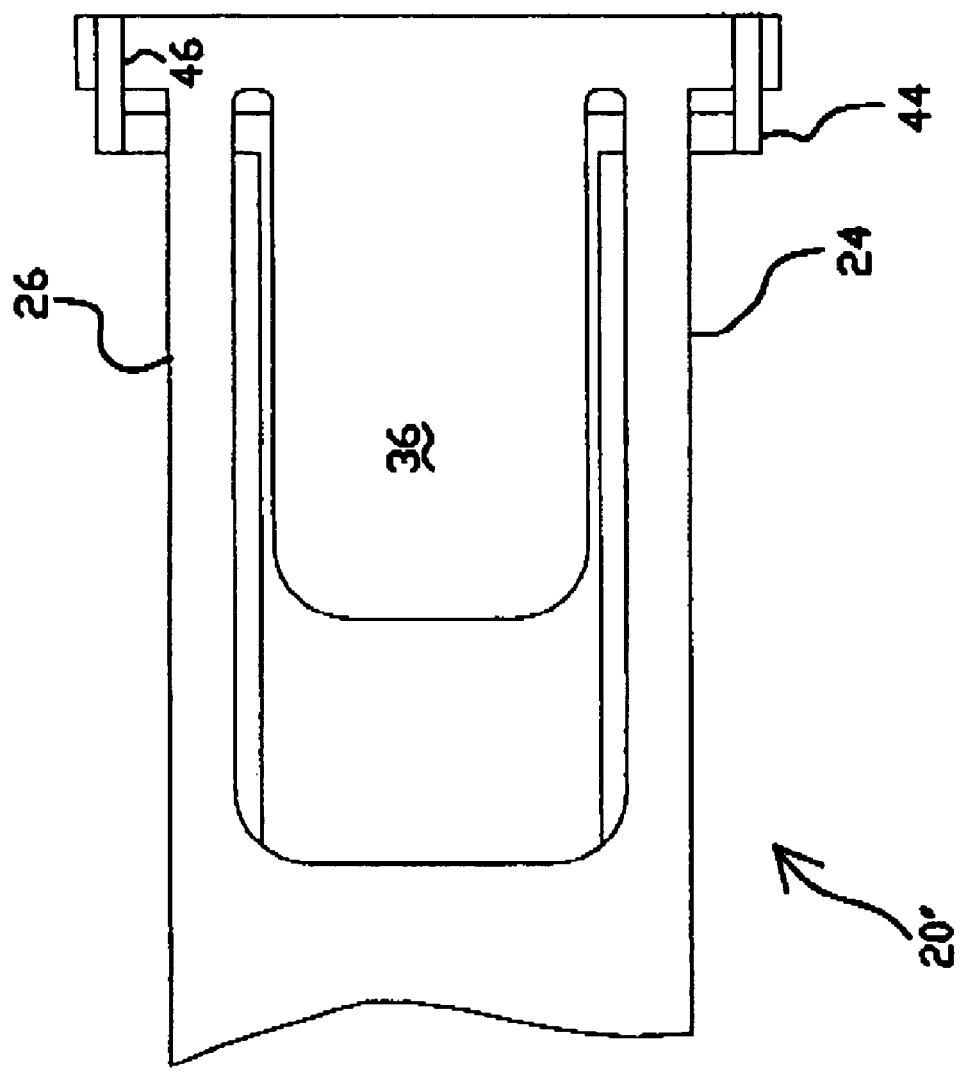
FIG. 5 is a plan view similar to that of FIG. 1A except showing another version having a pair of limiters distal of the gimbal.
Figure 6:
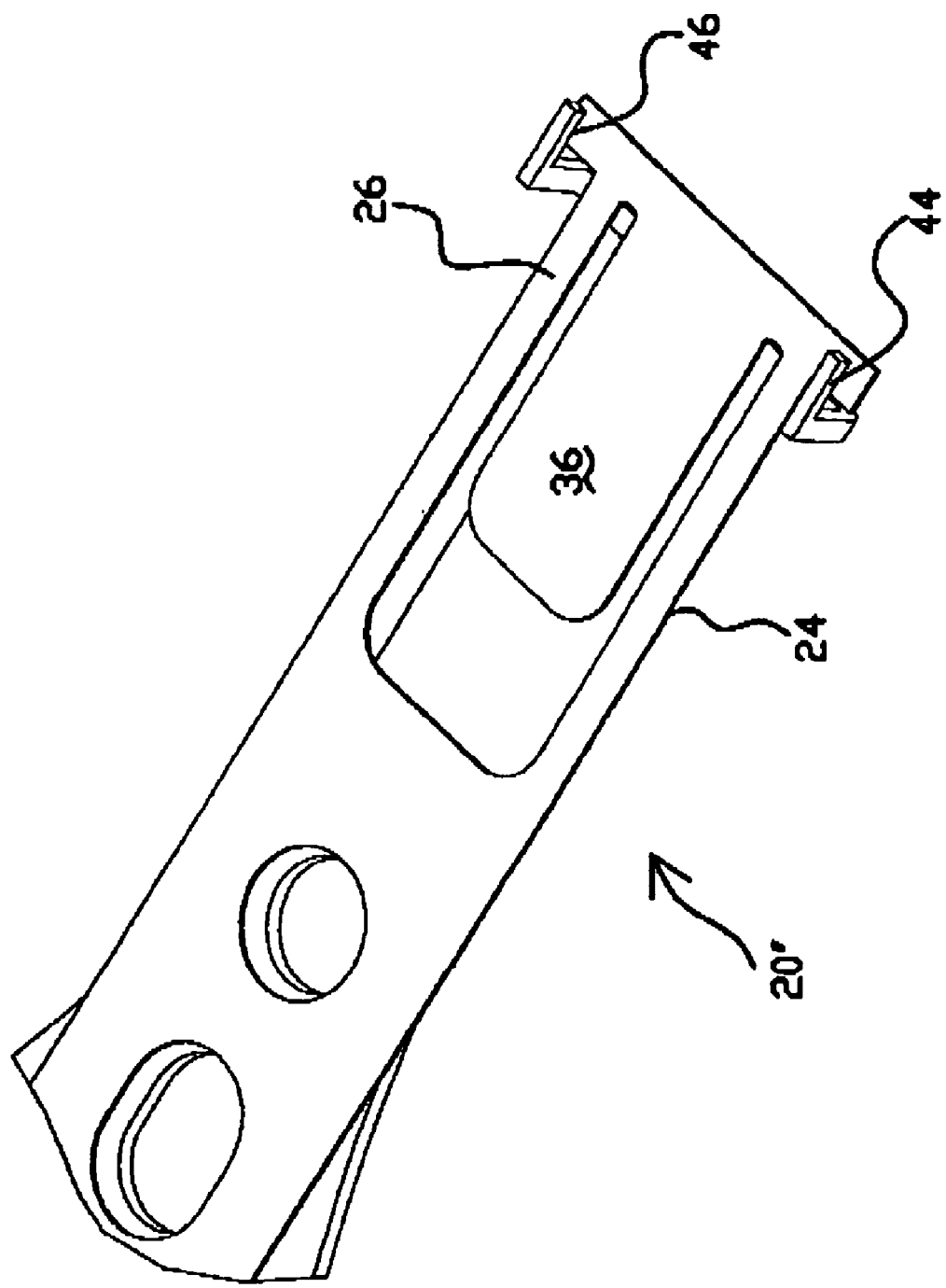
FIG. 6 is a perspective view corresponding to FIG. 5
Figure 7:
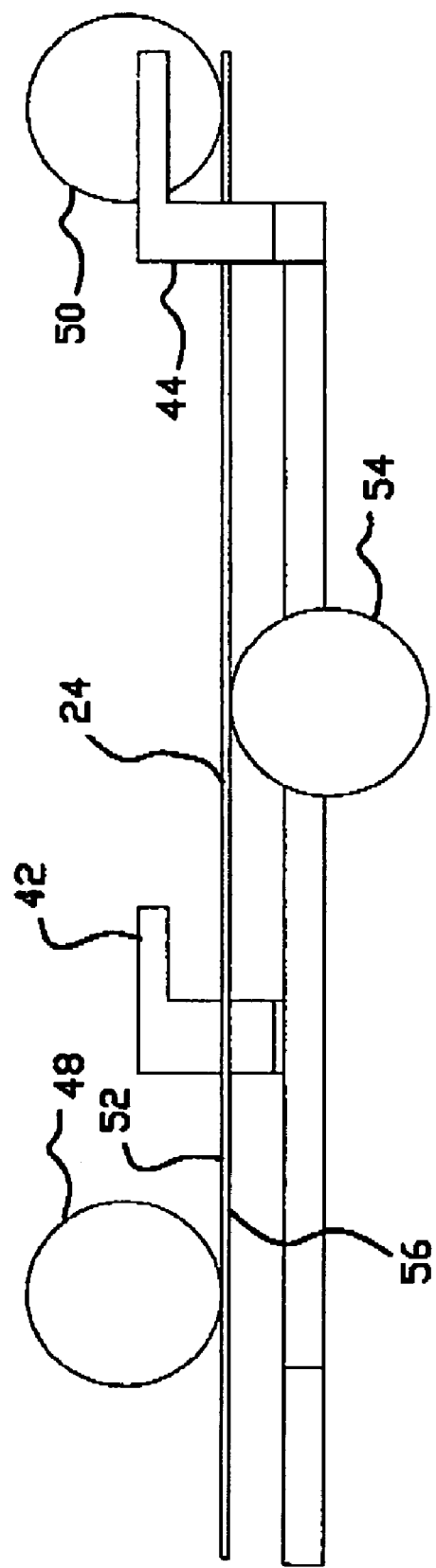
FIG. 7 is a simplified side elevation view of the gimbal region of the version shown in FIG. 1A, along with a simplified view of gimbal arm adjusting members useful in the practice of the present invention.
Figure 8:
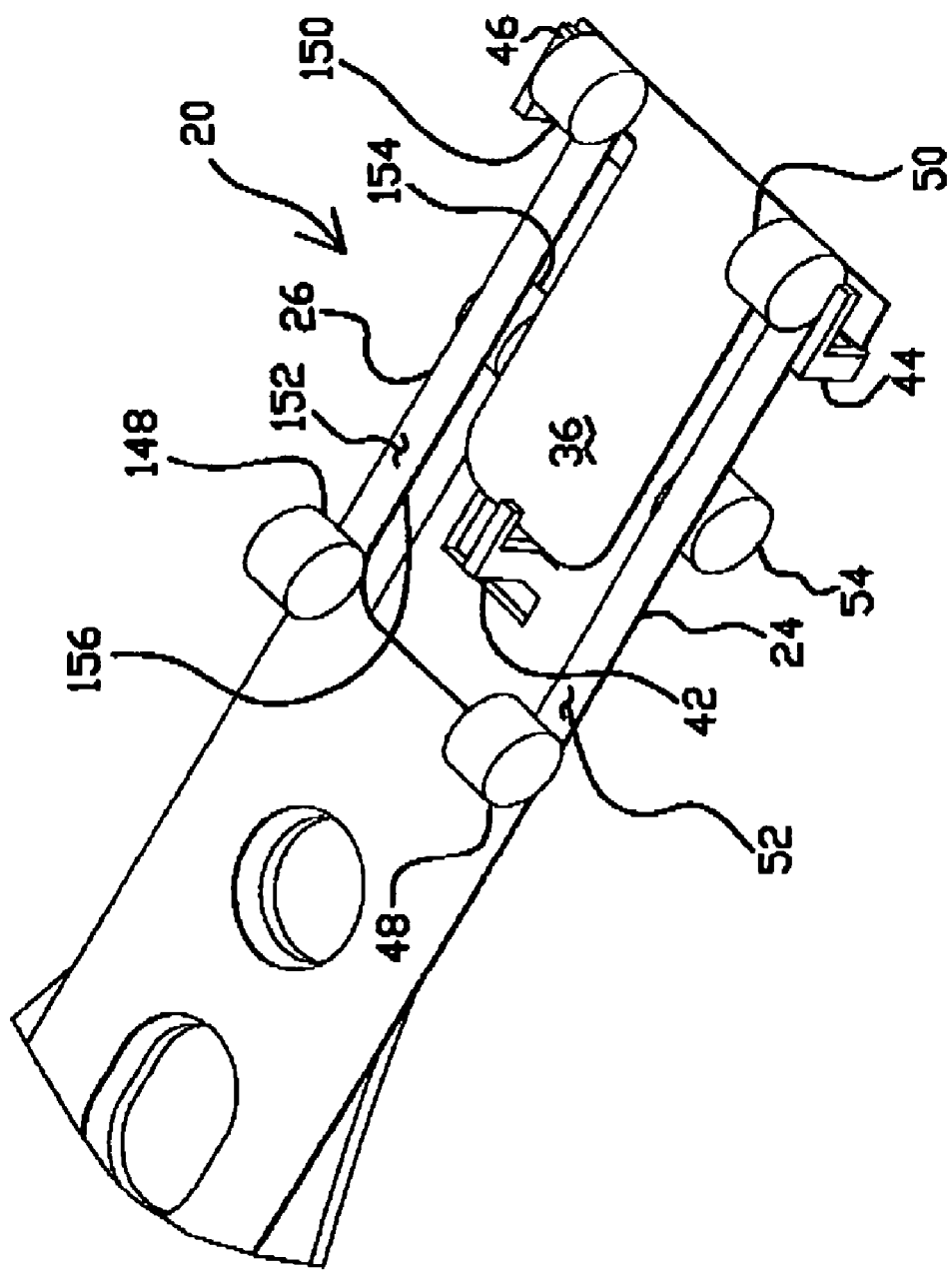
FIG. 8 is a perspective view corresponding to FIG. 7.

Referring now to FIGS. 3-6, various alternative versions of limiters for gimbal regions for use with the present invention may be seen. FIGS. 3 and 4 show a gimbal region 20' with only a proximal limiter 42, and FIGS. 5 and 6 show a gimbal region 20" with only a pair of distal limiters 44 and 46. It is to be understood, however that the present invention is not limited to the specific types of limiters shown, but may be used with a wide variety of limiter designs, whether shown herein or not.

Referring now to FIGS. 7-12, the gimbal region 20 of FIG. 1A may be seen along with three constraints for each gimbal arm useful in the practice of the present invention to perform adjustment of static attitude parameters of roll or pitch (or both) for the gimbal region 20 of the head suspension assembly 8. In these figures, a first pair of spaced apart constraints (or first contacting surfaces) 48 and 50 are located against a first side 52 of gimbal arm 24, and a third constraint (or second contacting surface) 54 is located against a second side 56 of gimbal arm 24. Furthermore, second contacting surface 54 is located intermediate the spaced apart locations of the first contacting surfaces 48 and 50.

Figure 9:
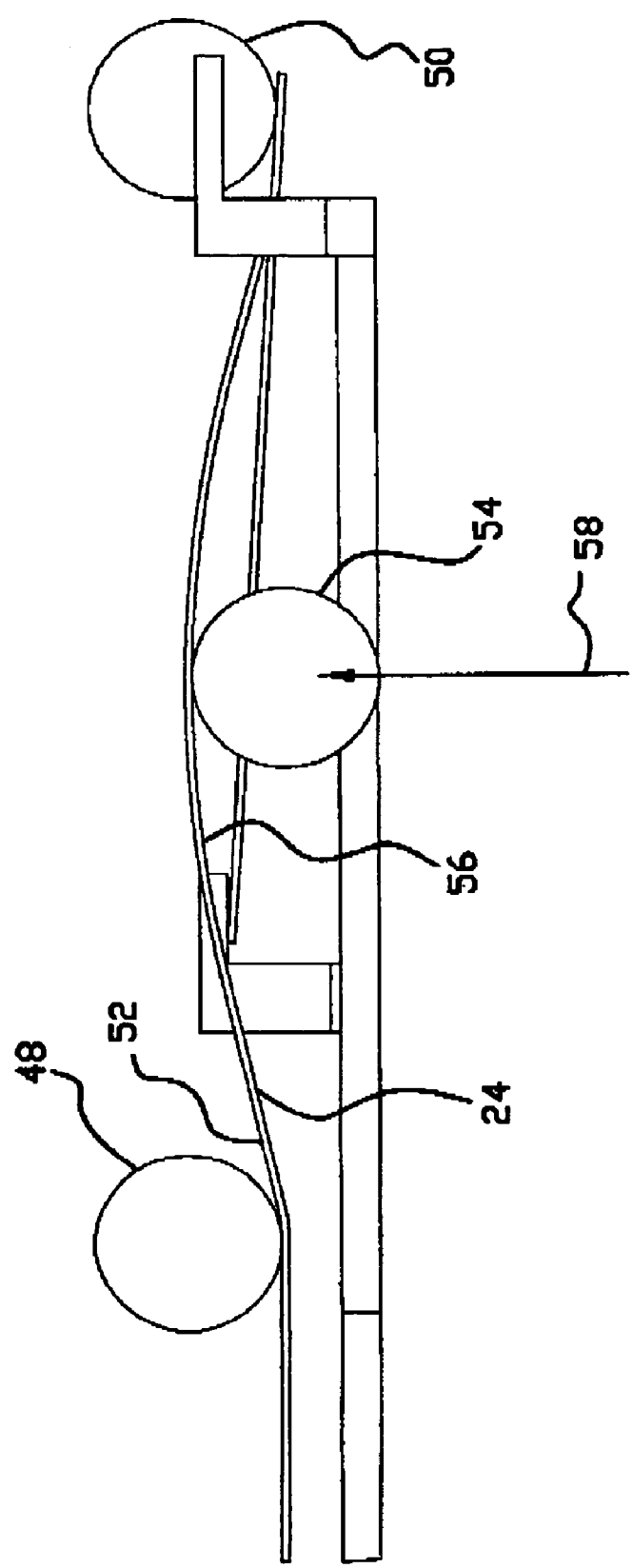
FIG. 9 is a view corresponding to FIG. 7, except with the gimbal adjusting members advanced toward each other in the practice of the present invention.
Figure 10:
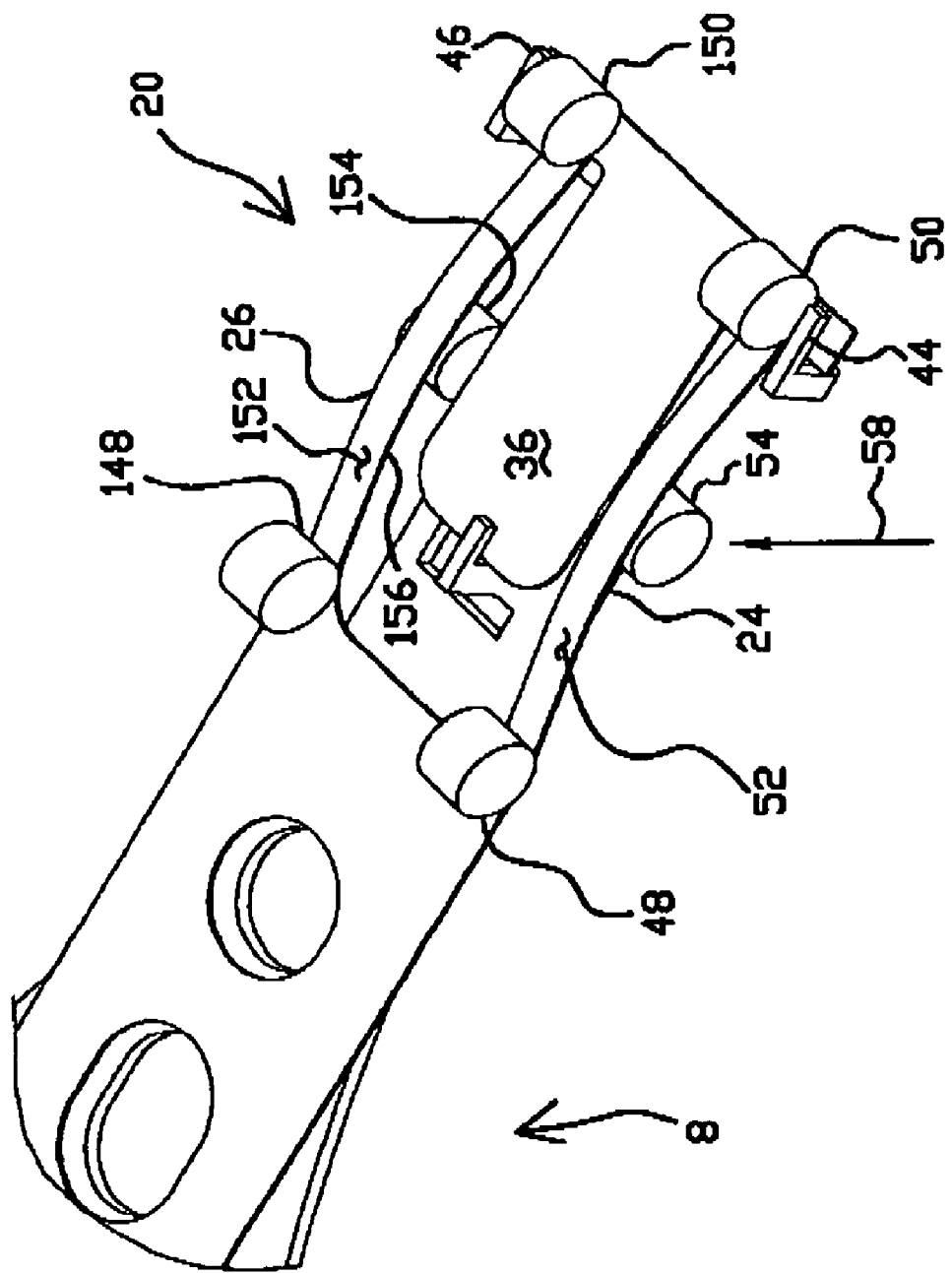
FIG. 10 is a perspective view corresponding to FIG. 9.

Referring now to FIGS. 9 and 10, the gimbal arm 24 is plastically deformed by causing relative movement between the second contacting surface 54 and the pair of first contacting surfaces 48 and 50. The relative position between the first contacting surfaces 48 and 50 is preferably but not necessarily maintained constant prior to and during the time the second contacting surface 54 is moved relative thereto. It is to be understood that while elements 48, 50 and 54 are shown as cylinders in these figures, these elements are not required to be cylindrical in the practice of this invention; what is important is that each of elements 48, 50 and 54 include a surface in contact with the gimbal arm on which adjustment is to be performed. It is also to be understood that while both gimbal arms 24 and 26 are shown deformed in FIG. 10, in the practice of the present invention, only one gimbal arm may be deformed, as described above. Deforming one arm alone (or both arms unequally) is within the scope of the present invention. Deforming both arms either partially or fully simultaneously or consecutively and to an equal or unequal extent are all likewise within the present invention.

Figure 11:
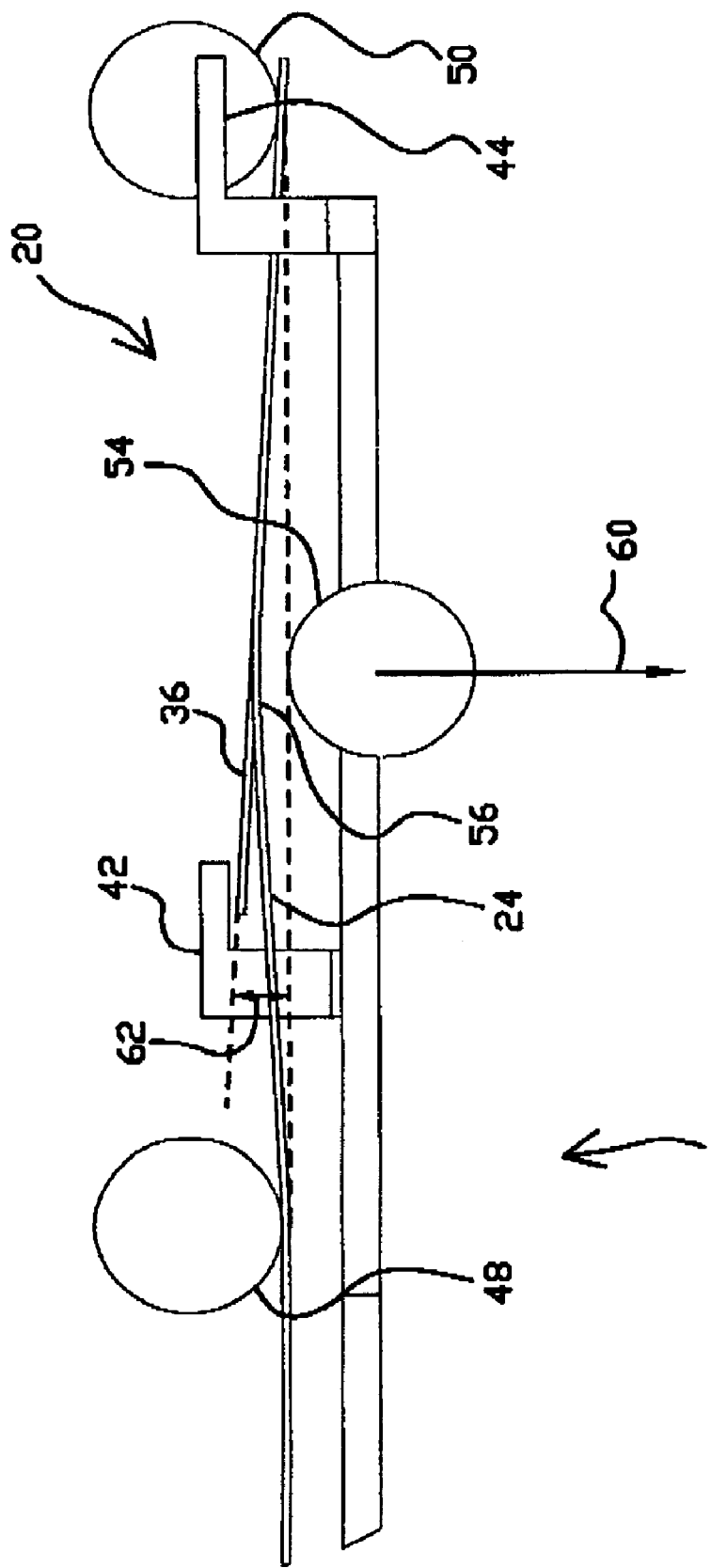
FIG. 11 is a view corresponding to FIG. 7, except after adjustment according to the present invention.

In FIG. 9, second contacting surface 54 is moved relative to first contacting surfaces 48 and 50 in the direction of arrow 58 by a predetermined amount to plastically deform at least gimbal arm 24. Referring now also to FIG. 11, the third constraint or second contacting surface 54 is subsequently moved in the direction of arrow 60 (which is preferably opposite to the direction of arrow 58) to retract surface 54 away from the second side 56 of gimbal arm 24. FIG. 11 illustrates that gimbal arm 24 has undergone a permanent deformation to adjust at least one of the roll and pitch parameters of the gimbal region 20 of head suspension assembly 8.

Referring now again to FIGS. 8, 10 and 12, the second gimbal arm 26 may be adjusted by contacting a first side 152 of the second gimbal arm 26 at a pair of spaced apart locations with a pair of third contacting surfaces 148 and 150 and contacting a second side 156 of the second gimbal arm at an intermediate location between the spaced apart locations with a fourth contacting surface 154; and plastically deforming the second gimbal arm 26 by causing relative movement between the fourth contacting surface 154 and third contacting surfaces 148, 150. It is preferable but not necessary to maintain the relative position between the pair of third contacting surfaces 148 and 150 during the relative movement of the fourth contacting surface 154 to provide adjustment of at least one of a pitch and roll parameter of the gimbal 20 to a desired amount.

Figure 12:
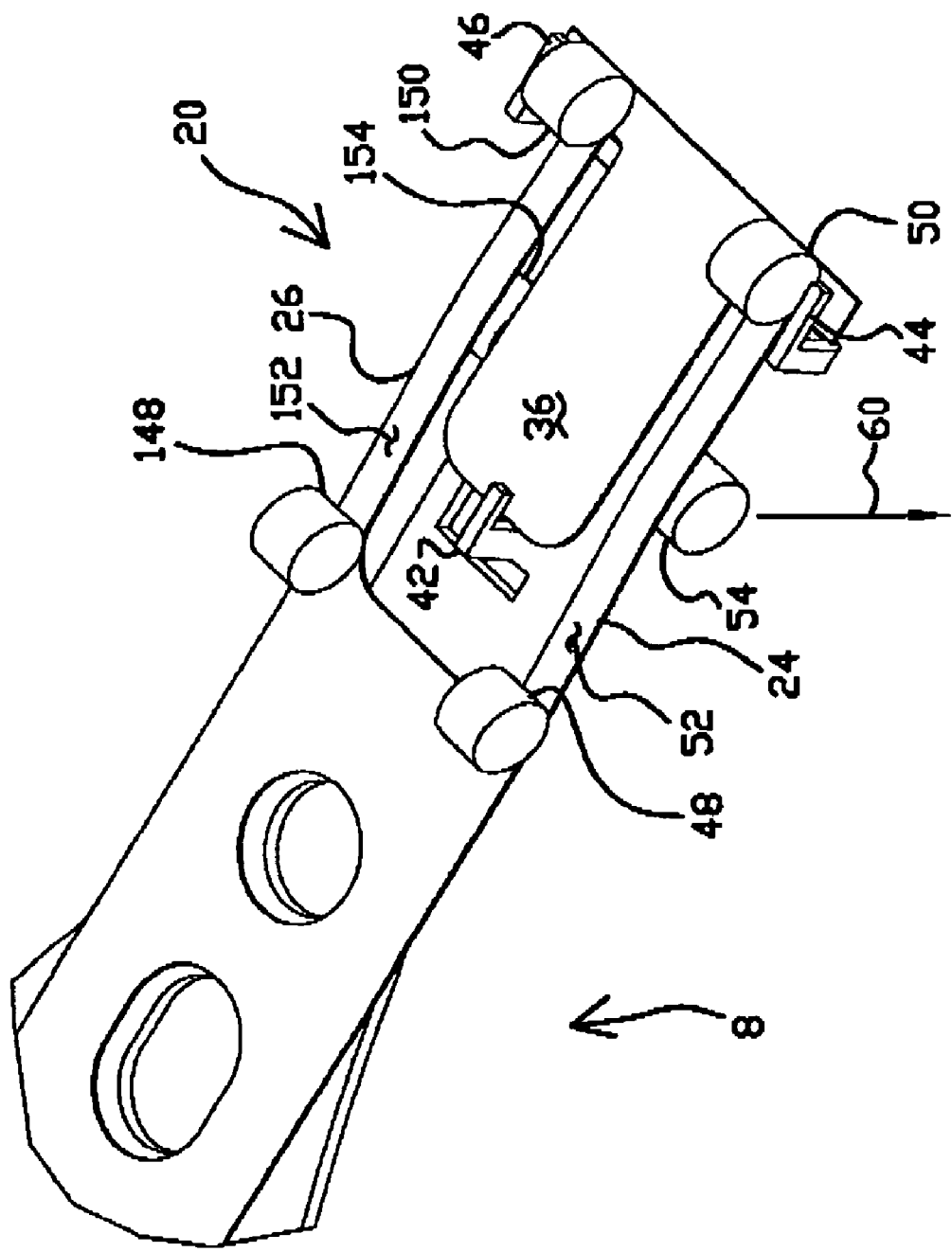
FIG. 12 is a perspective view corresponding to FIG. 11.

After the desired plastic deformation of one or both arms 24,26 is achieved, the intermediate contacting surface or surfaces 54, 154 are retracted in the direction of arrow 60, opposite in direction to arrow 58, as shown in FIGS. 11 and 12. FIG. 11 shows an example of pitch adjustment of the gimbal tongue 36 from the plastic deformation of both arms 24 and 26 as described above. In FIG. 11, it may be seen that tongue 36 is positioned at a pitch angle 62. It is to be understood that another result that may be achieved is to adjust the roll angle of the tongue 36, by only adjusting one arm or by making unequal adjustments to both arms.

Figure 13:
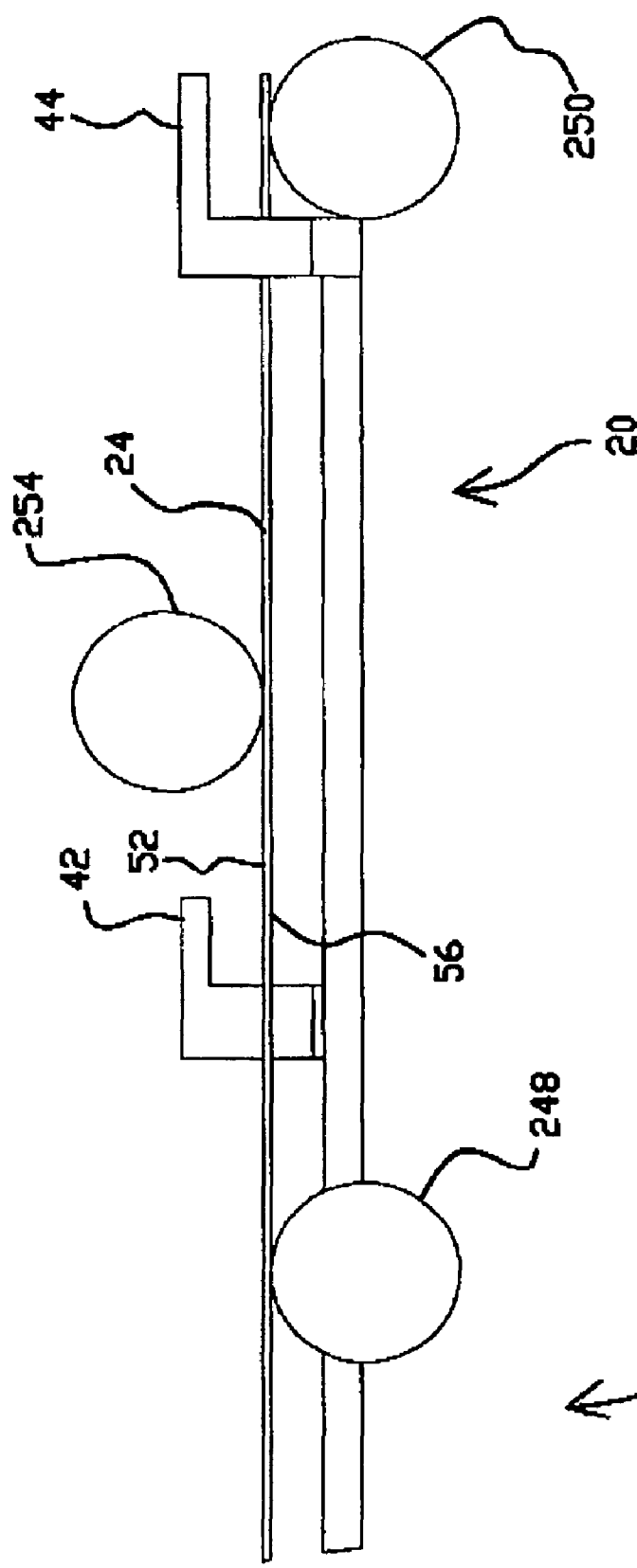
FIG. 13 is a simplified side elevation view of the gimbal region of the version shown in FIG. 1A, along with a simplified view of gimbal arm adjusting members useful in the practice of the present invention in an inverted relationship as compared to that shown in FIG. 7.
Figure 14:
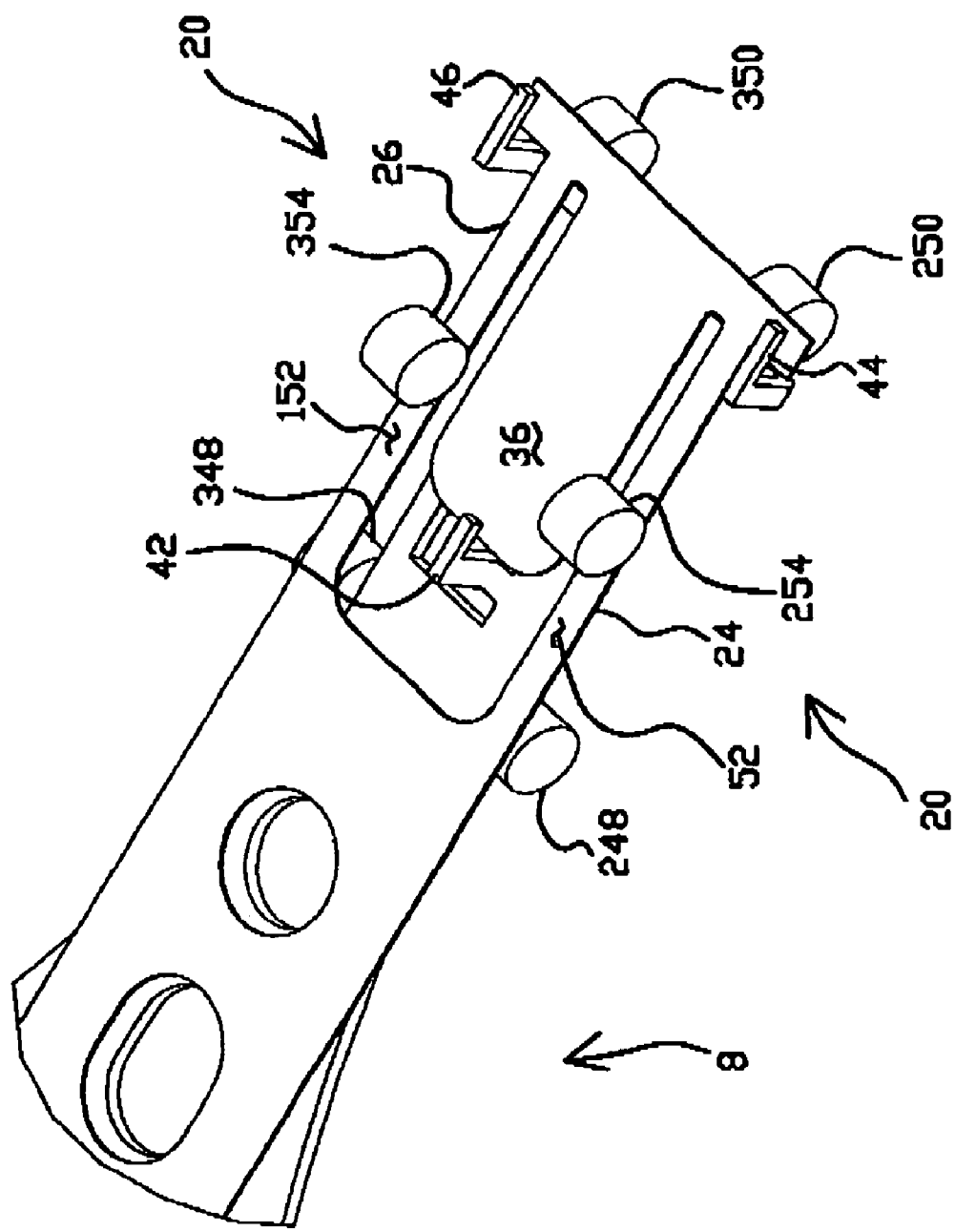
FIG. 14 is a perspective view corresponding to FIG. 13.
Figure 15:
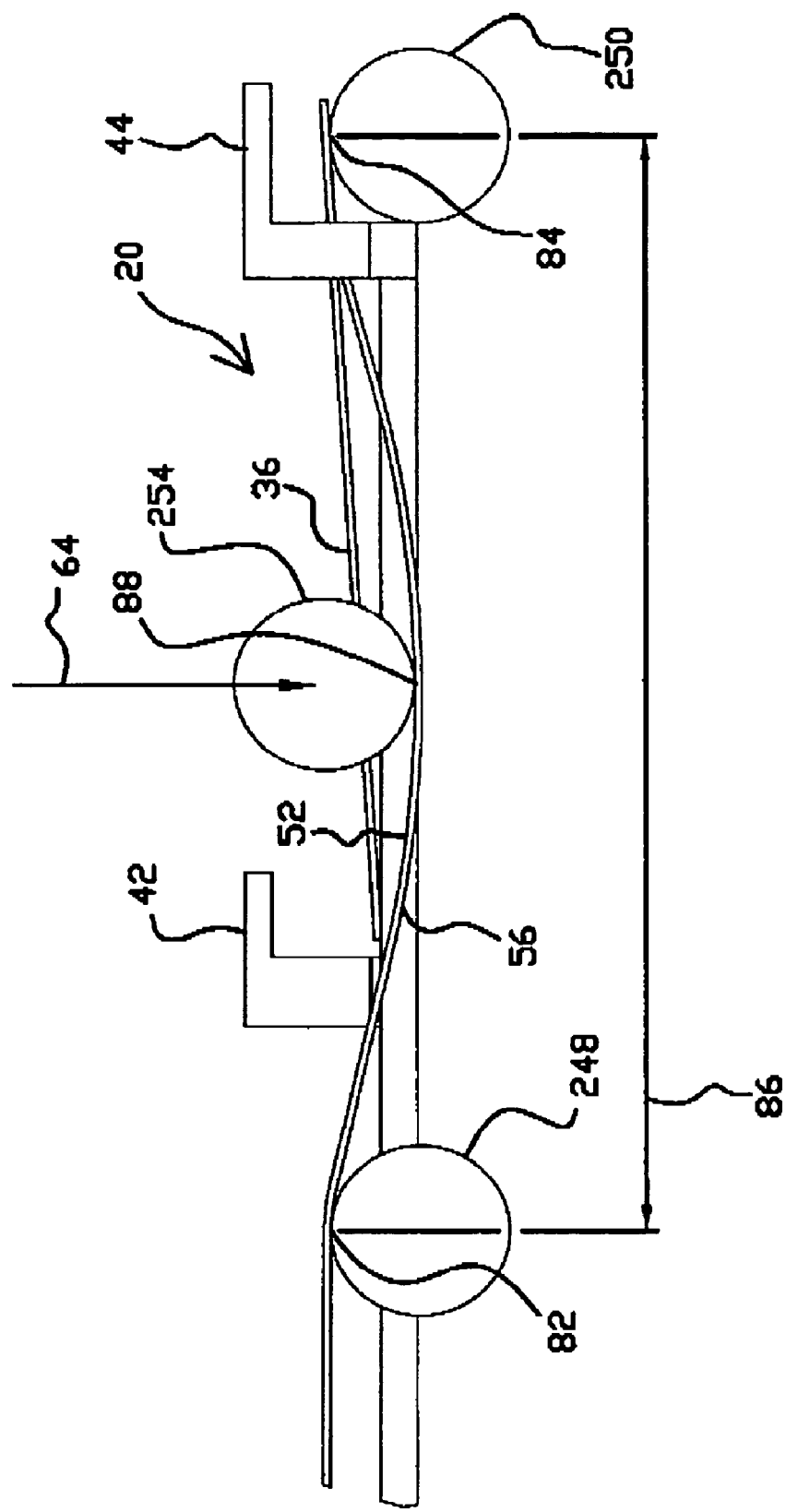
FIG. 15 is a view corresponding to FIG. 13, except with the gimbal adjusting members advanced toward each other in the practice of the present invention in a direction opposite to that shown in FIG. 9.
Figure 16:
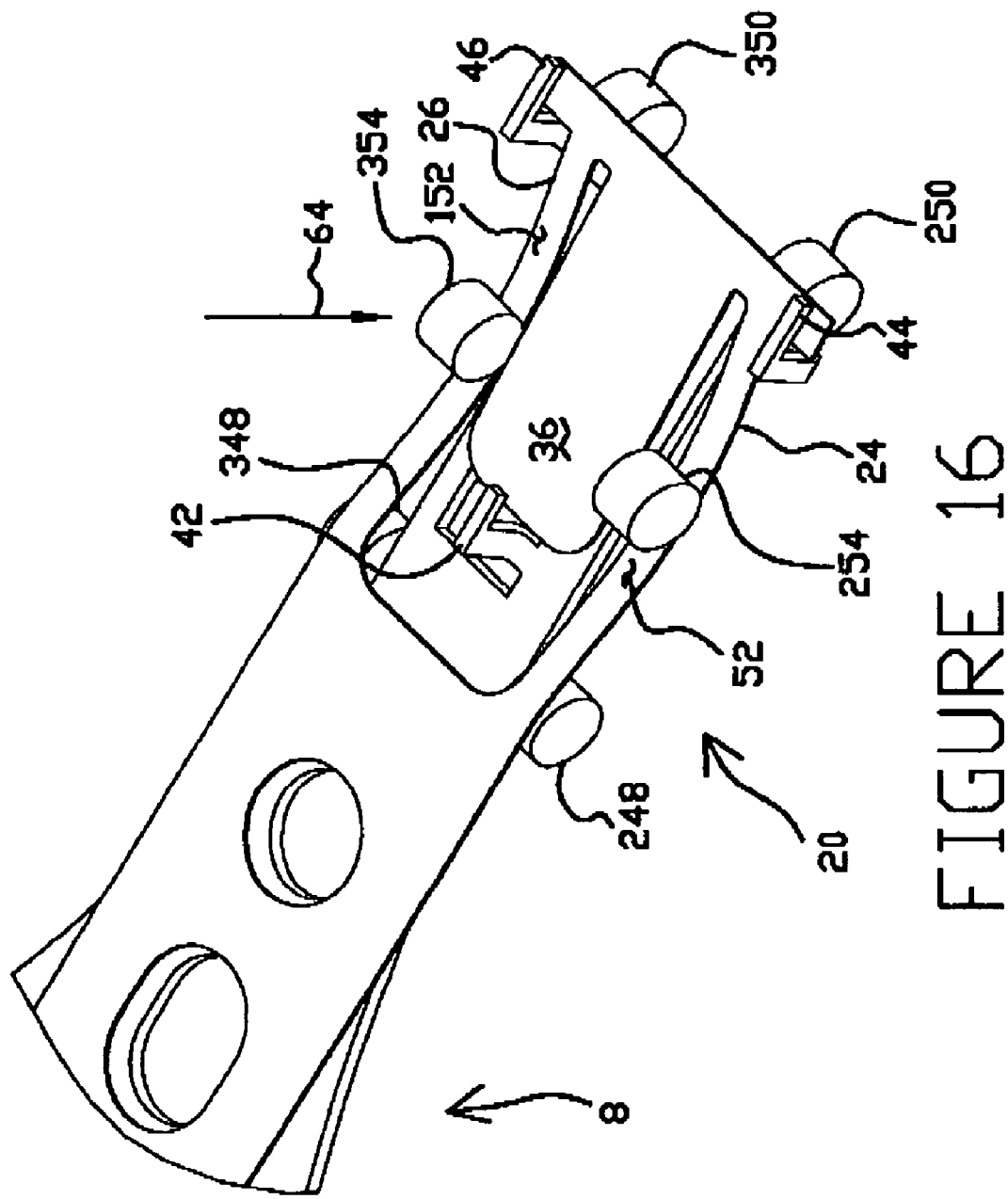
FIG. 16 is a perspective view corresponding to FIG. 15.

Referring now to FIGS. 13-16, reverse adjustment of the gimbal region 20 may be seen. FIG. 13 corresponds to FIG. 7 except that spaced apart surfaces or members 248 and 250 are in contact with the second side 56 of arm 24 and the intermediate surface or member 254 is in contact with the first side 52 of arm 24. FIG. 14 corresponds to FIG. 8, with similar inversions for the surfaces or members 348, 350 and 354 in contact with arm 26. FIGS. 15 and 16 illustrate a process of plastic deformation in the reverse direction (along arrow 64) to that shown in FIGS. 9 and 10.

Figure 17:
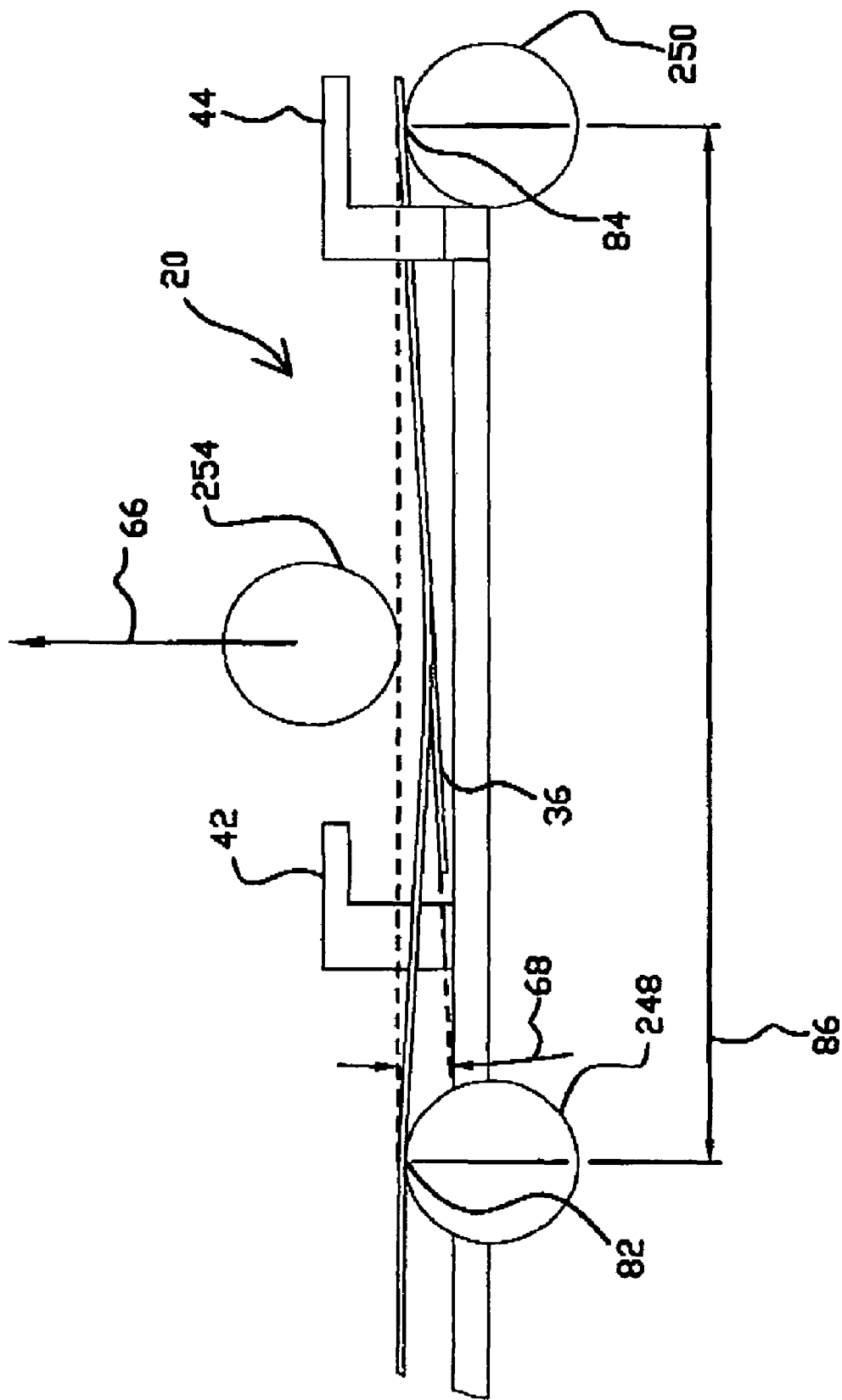
FIG. 17 is a view corresponding to FIG. 13, except after adjustment according to the present invention.
Figure 18:
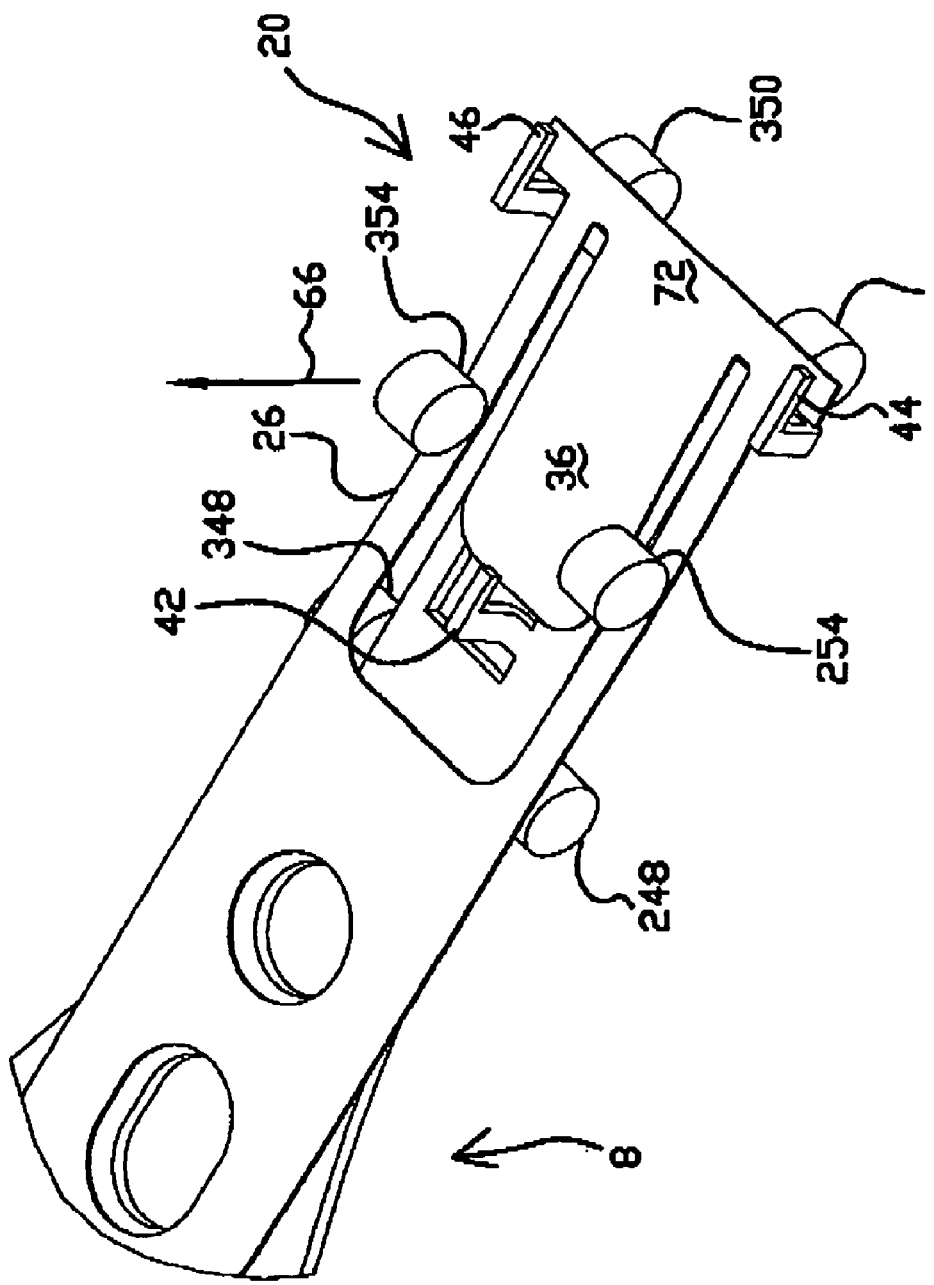
FIG. 18 is a perspective view corresponding to FIG. 17.

Once reverse adjustment of one or both of pitch and roll static attitude parameters of the gimbal region 20 are achieved by the apparatus and through the process shown in FIGS. 13-16, the intermediate member or members 254, 354 are retracted in the direction of arrow 66, as shown in FIGS. 17 and 18, resulting in, for example a pitch angle 68 shown in FIG. 17.

The method described above is thus seen to be suitable for adjusting a static attitude for a head suspension having a gimbal with at least one gimbal arm by contacting a first side of the at least one gimbal arm at a pair of spaced apart locations with a pair of first contacting surfaces; contacting a second side of the at least one gimbal arm at an intermediate location between the spaced apart locations with a second contacting surface; and plastically deforming the at least one gimbal arm by causing relative movement between the second and first contacting surfaces while maintaining a relative position between the pair of first contacting surfaces such that at least one of a pitch and roll parameter of the gimbal is adjusted to a desired amount.

The method may further include the situation where the at least one gimbal arm is a first gimbal arm and the gimbal has a second gimbal arm and the method includes contacting a first side of the second gimbal arm at a pair of spaced apart locations with a pair of third contacting surfaces; contacting a second side of the second gimbal arm at an intermediate location between the spaced apart locations with a fourth contacting surface; and plastically deforming the second gimbal arm by causing relative movement between the third and fourth contacting surfaces while maintaining a relative position between the pair of third contacting surfaces such that at least one of a pitch and roll parameter of the gimbal is adjusted to a desired amount.

Figure 19:
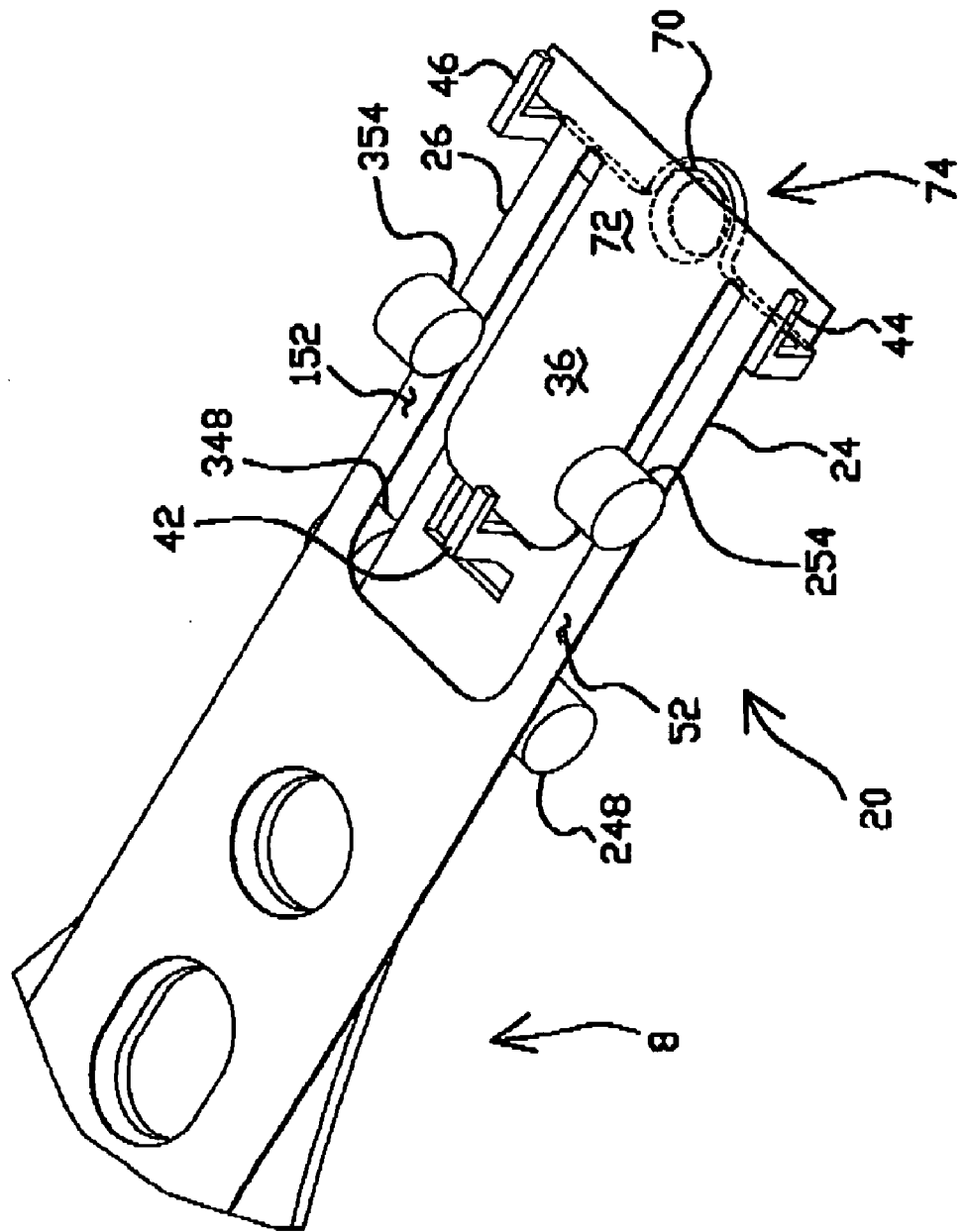
FIG. 19 is a view similar to FIG. 14, except showing use of a dimple in the practice of the present invention.
Figure 20:
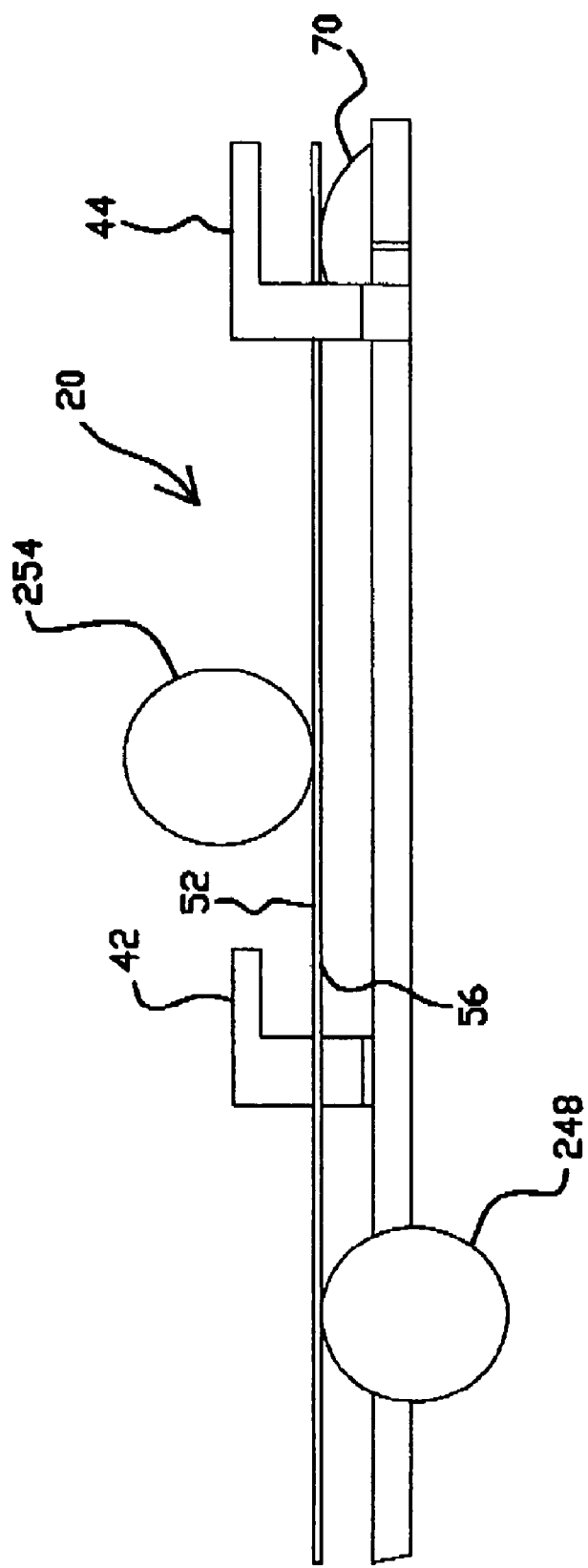
FIG. 20 is a side view of the apparatus shown in FIG. 19.

Referring now to FIGS. 19 and 20, the present invention may be practiced in connection with adjusting pitch by using a dimple 70 in place of the spaced apart constraints or surfaces 250, 350. Dimple 70 cooperates with surfaces 248 and 348 to provide a reaction surface or "dimple contact" spaced apart from surfaces 248 and 348 when both arms 24 and 26 are acted upon by surfaces 254 and 354. The dimple 70 is able to provide the function of constraints 250 and 350 because of the transverse connection 72 (also shown in FIG. 18, for clarity) at a free end 74 of the gimbal region 20. The operation of the version shown in FIGS. 19 and 20 is otherwise the same as that described for FIGS. 13-18, when both arms are simultaneously adjusted.

Figure 21:
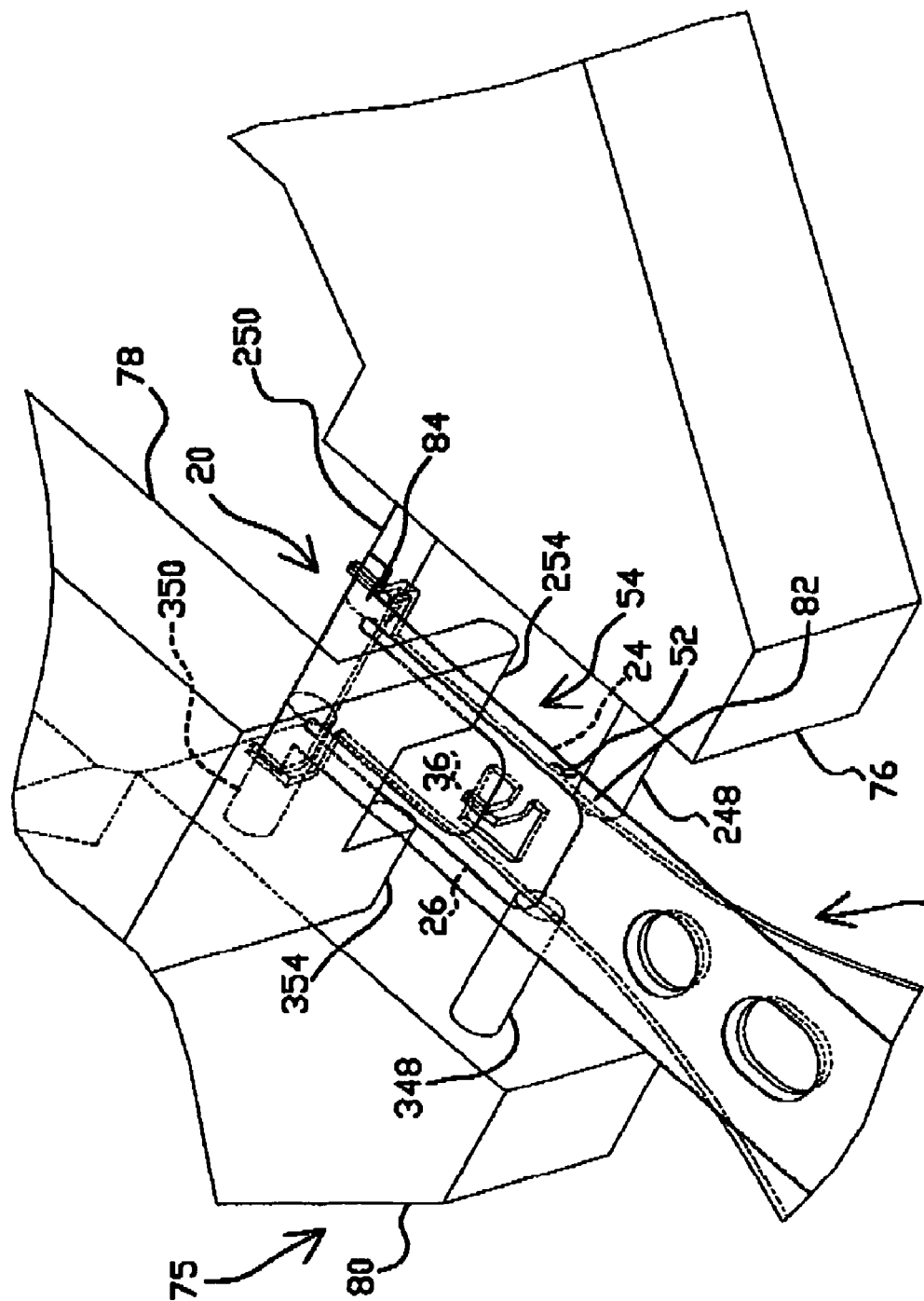
FIG. 21 is a fragmentary perspective view from above of a gimbal region of a head suspension as shown in FIG. 1A, along with a simplified view of an adjustment mechanism including gimbal arm adjusting members corresponding to FIGS. 13 and 14, useful in the practice of the present invention.

Referring now to FIG. 21, a simplified perspective view of an adjustment mechanism or apparatus 75 including gimbal arm adjusting members 248, 348, 250, 350, 254, 354 (corresponding to FIGS. 13 and 14) may be seen, with the gimbal region 20 of the head suspension assembly 8 of FIG. 2 shown in phantom. The apparatus 75 is for adjusting at least one parameter of the static attitude of the head suspension 8 having the gimbal region 20 with at least one gimbal arm 24. The apparatus 75 may include a pair of first contacting members 248 and 250 contacting side 56 of the at least one gimbal arm 24 at a pair of spaced apart locations. The apparatus 75 further may include a second contacting member 254 contacting an opposite side 52 of the at least one gimbal arm 24 at an intermediate location between the spaced apart locations. The pair of first contacting members 248, 250 are preferably finger shaped projections carried by a first support arm 76. The second contacting member 254 may be a surface or projection extending from a second support arm 78. It is to be understood that the first and second contacting members may move together relative to each other to plastically deform arm 24 by the relative movement between the second and first contacting members while the spaced apart location between the first contacting members is maintained during the plastic deformation such that at least one of a pitch and roll parameter of the gimbal 20 is adjusted to a desired amount.

The apparatus described may be seen to be suitable for adjusting a static attitude for a head suspension having a gimbal with at least one gimbal arm, with the apparatus including a pair of first contacting members contacting a first side of the at least one gimbal arm at a pair of spaced apart locations, and a second contacting member contacting a second side of the at least one gimbal arm at an intermediate location between the spaced apart locations, wherein the first and second contacting members move together relative to each other, plastically deforming the at least one gimbal arm by the relative movement between the second and first contacting members while the spaced apart location between the first contacting members is maintained during the plastic deformation such that at least one of a pitch and roll parameter of the gimbal is adjusted to a desired amount.

The apparatus may further include a pair of third contacting members contacting a first side of the second gimbal arm at a pair of spaced apart locations, a fourth contacting member contacting a second side of the second gimbal arm at an intermediate location between the spaced apart locations; and plastically deforming the second gimbal arm by causing relative movement between the third and fourth contacting surfaces while maintaining a relative position between the pair of third contacting surfaces such that at least one of a pitch and roll parameter of the gimbal is adjusted to a desired amount.

The apparatus 75 may be used with a suspension having a gimbal 20 wherein the at least one gimbal arm is a first gimbal arm 24 and the gimbal 20 has a second gimbal arm 26, in which case the apparatus 75 may further include a pair of third contacting members 348 and 350 contacting one side 156 of the second gimbal arm 26 at a pair of spaced apart locations and a fourth contacting member 354 contacting side 152 of the second gimbal arm 26 at an intermediate location between the spaced apart locations. The pair of third contacting members 248, 250 are preferably finger shaped projections carried by a third support arm 80. The fourth contacting member 254 may be a surface or projection extending from the second support arm 78. It is to be understood that the third and fourth contacting members may move together relative to each other to plastically deform the second gimbal arm 26 by causing relative movement between the third and fourth contacting surfaces while maintaining a relative position between the pair of third contacting surfaces such that at least one of a pitch and roll parameter of the gimbal is adjusted to a desired amount.

Figure 22:
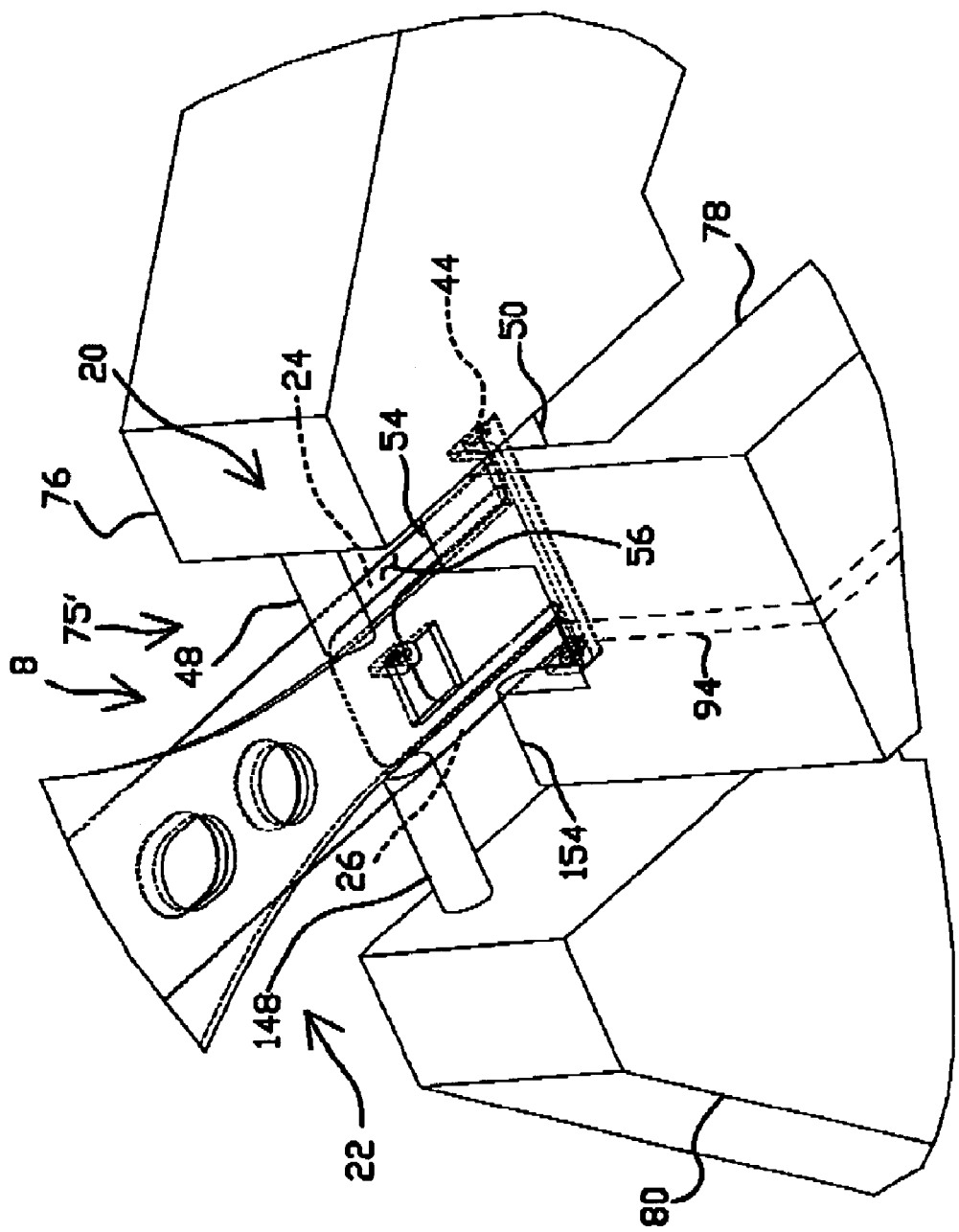
FIG. 22 is a perspective view similar to that of FIG. 21, except from below and with an arrangement of gimbal arm adjusting members corresponding to FIGS. 7 and 8.

Referring now to FIG. 22, an alternative arrangement of the adjustment mechanism or apparatus 75' including gimbal arm adjusting members 48, 148, 50, 150, 54, 154 (corresponding to FIGS. 7 and 9) may be seen, with the opposite side 22 of gimbal region 20 of the head suspension assembly 8 (corresponding to that shown in FIG. 2A) illustrated in phantom. The apparatus 75' is for adjusting at least one parameter of the static attitude of the head suspension 8 having the gimbal region 20 with at least one gimbal arm 24 as illustrated in the sequence shown in FIGS. 9-12. The apparatus 75' may include a pair of first contacting members 48 and 50 contacting side 52 of the at least one gimbal arm 24 at a pair of spaced apart locations. The apparatus 75' further may include a second contacting member 54 contacting an opposite side 56 of the at least one gimbal arm 24 at an intermediate location between the spaced apart locations. The pair of first contacting members 48, 50 are preferably finger shaped projections carried by the first support arm 76, which in this arrangement is located to contact side 22 of gimbal 20, (opposite that shown in FIG. 21). The second contacting member 54 may be a surface or projection extending from the second support arm 78' (which may be bifurcated) and which in this arrangement is located to contact side 22 of gimbal 20. Preferably the first and second contacting members move together relative to each other (as shown by arrow 58 in FIGS. 9 and 10) to plastically deform arm 24 by the relative movement between the second and first contacting members while the spaced apart location between the first contacting members is maintained during the plastic deformation such that at least one of a pitch and roll parameter of the gimbal 20 is adjusted to a desired amount. Although not shown, it is to be understood that arm 78' may be bifurcated (for example, along dashed gap 94) to permit control of surfaces 54 and 154 independent of each other for separate adjustment of arms 24 and 26 of gimbal 20. As with FIG. 21, either one or both gimbal arms may be adjusted with the apparatus 75' of FIG. 22. It is to be further understood that apparatus 75 and apparatus 75' may be combined to adjust in both directions, as will be illustrated in FIGS. 24 and 25.

Figure 23:
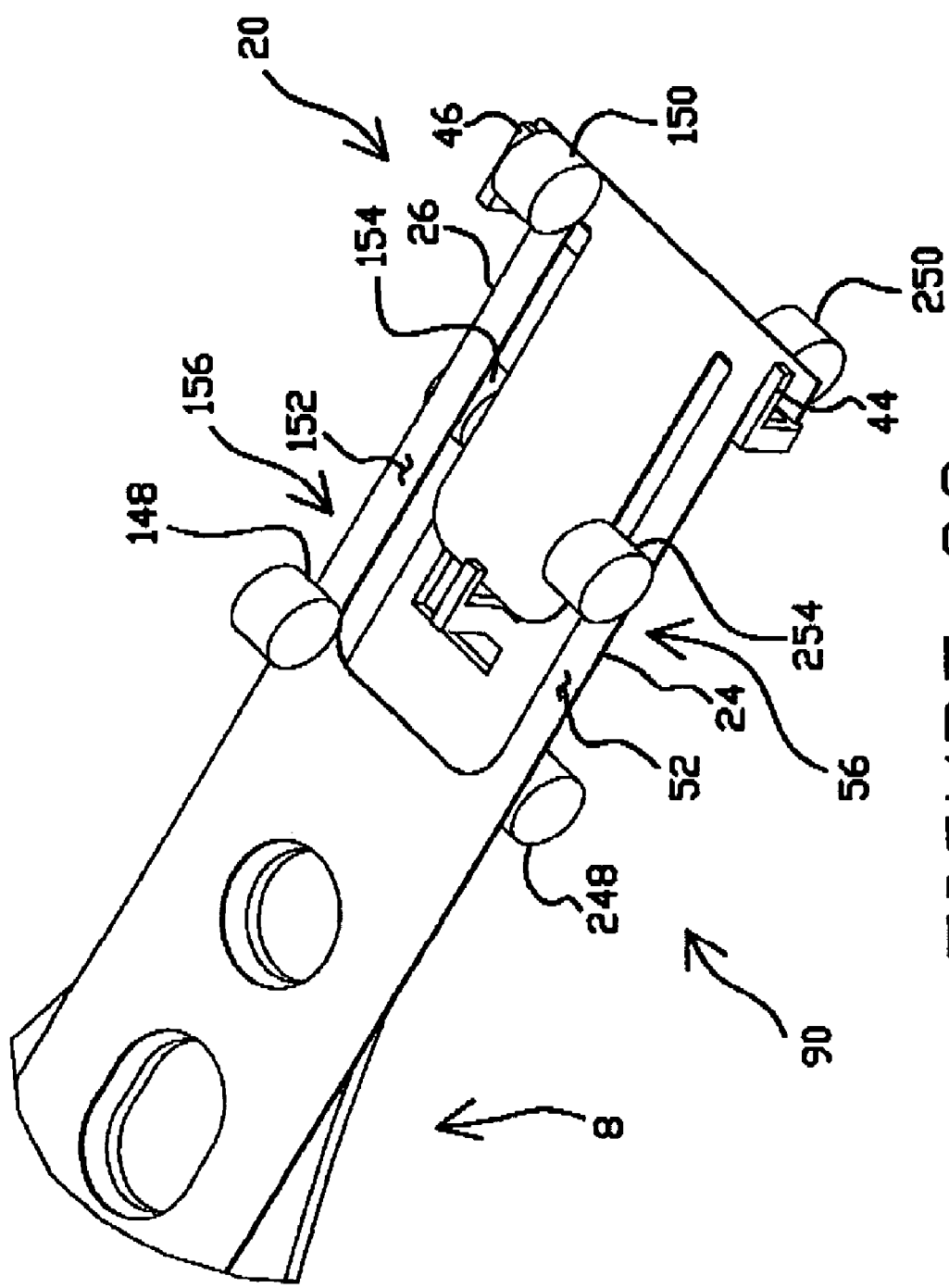
FIG. 23 is a perspective view of an alternative arrangement for adjustment, with a near lateral side corresponding to FIG. 14 and a far lateral side corresponding to FIG. 8 to provide the capability of adjusting gimbal arms in opposite directions.

Referring now to FIG. 23 along with FIGS. 15 and 17, another arrangement 90 for an adjustment apparatus may be seen. The arrangement 90 may be useful when it is desired to make oppositely oriented adjustments on the respective gimbal arms of a head suspension, such as suspension 8, or another suspension having a gimbal with first and second sides and with first and second gimbal arms, such as arms 24 and 26, with each gimbal arm having a first side on the first side of the gimbal and each gimbal arm having a second side on the second side of the gimbal. The arrangement 90 shown in FIG. 23 includes the pair of first contacting members 248 and 250 contacting what has been described above as the second side 56 of the first gimbal arm 24 at a pair of spaced apart locations 82, 84 which may be spaced apart by a distance 86 (shown in FIGS. 15 and 17). The arrangement 90 further includes the second contacting member 254 contacting the first side 52 of the first gimbal arm 24 at an intermediate location 88 between the spaced apart locations 82 and 84 of the first contacting members 248 and 250. Although location 88 is shown in FIG. 15 substantially equidistant from locations 82 and 84, it is to be understood that, in the practice of the present invention, it is not necessary that location 88 be equidistant from locations 82 and 84, only that it be intermediate those locations.

Arrangement 90 is shown with the pair of third contacting members 148 and 150 contacting the first side 152 of the second gimbal arm 26 at a pair of spaced apart locations; and the fourth contacting member 154 contacting the second side 156 of the second gimbal arm 26 at an intermediate location between the spaced apart locations of the third contacting surfaces or members. In operation, this arrangement allows opposite adjustments to be made to the first and second gimbal arms when there is relative movement between the respective intermediate contacting member and the spaced apart members on opposite sides of at least one of the first and second gimbal arms resulting in plastically deformation of that gimbal arm such that at least one of a pitch and roll parameter of the gimbal is adjusted to a desired amount. It is to be understood that the near and far lateral side positions of the contacting members may be reversed (i.e., to move each of the contacting surfaces or members to the opposite side of the gimbal), while still remaining within this aspect of the present invention.

Figure 24:
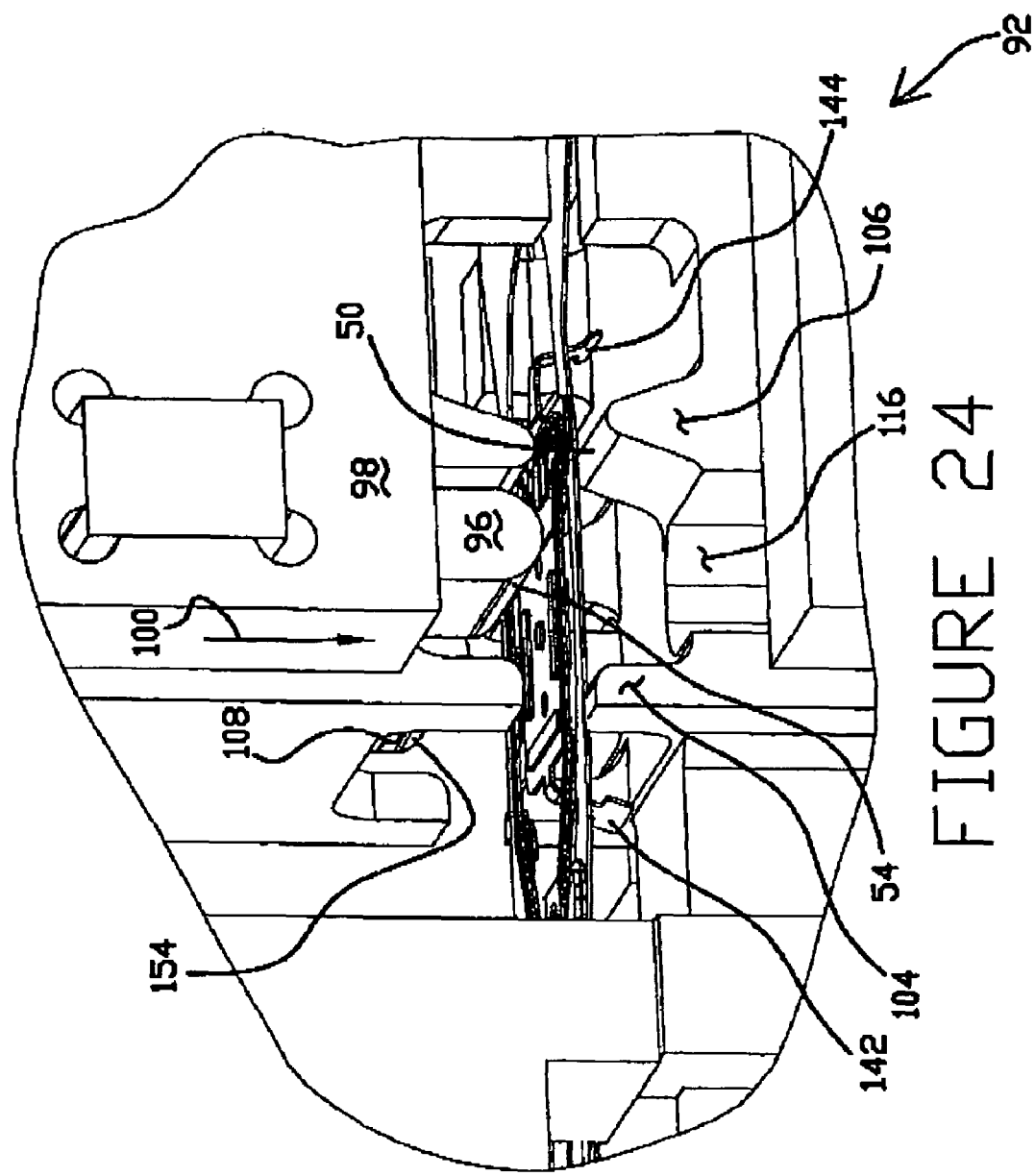
FIG. 24 is a fragmentary perspective view showing more details of a gimbal arm adjustment mechanism corresponding to FIGS. 13 and 14.
Figure 25:
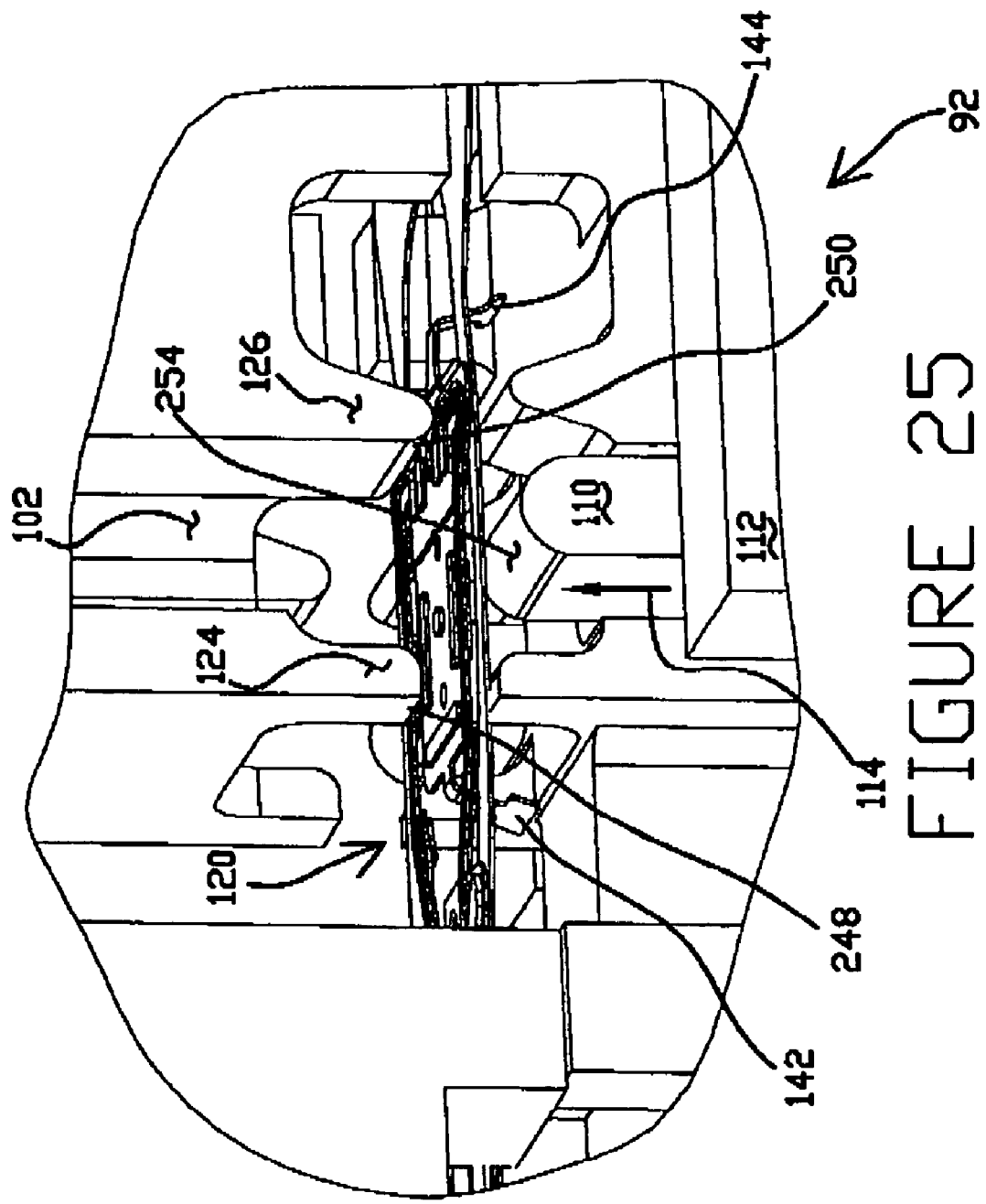
FIG. 25 is a fragmentary perspective view showing more details of a gimbal arm adjustment mechanism corresponding to FIGS. 7 and 8.

Referring now to FIGS. 24 and 25, still further details of a gimbal arm adjustment mechanisms may be seen. In each of these Figures, it is to be noted that an alternative gimbal and limiter arrangement 92 is shown, to illustrate that the present invention is not limited to the embodiment of the gimbal in the previous figures. Arrangement 92 has a gimbal 120 and a pair of "T" shaped limiters 142, 144, respectively proximal and distal of the gimbal 120. It is to be understood that FIGS. 24 and 25 illustrate apparatus suitable for adjusting one or both of pitch and roll parameters for the gimbal 120 from either side of the gimbal 120, with surface 54 in FIG. 24 acting against the gimbal arm intermediate surfaces 48 and 50. Surface 54 is located on a projection 96 carried by arm 98 for bidirectional movement parallel to arrow 100 in channel or recess 102 (visible in FIG. 25). Surface 48 is located on arm 104, and surface 50 is located on arm 106. Corresponding structures are located on the opposite lateral side of gimbal 120 including surface 154 on projection 108.

Referring now most particularly to FIG. 25, surface 254 is located on a projection 110 carried by arm 112 for bidirectional movement parallel to arrow 114 in channel or recess 116 (visible in FIG. 24). Although not shown, corresponding structures are located on the opposite lateral side of gimbal 120 in FIG. 25, as they are in FIG. 24. In FIG. 25, surface 248 is carried by arm 124 and surface 250 is carried by arm 126. As with FIG. 24, it is to be understood that corresponding structures are located on the opposite lateral side of gimbal 120 in FIG. 25.

It is also to be understood that the arrangements shown in FIGS. 24 and 25 may exist in the same adjustment fixture, with either direction of adjustment possible (i.e., using surface 54 or 254 on the one lateral side of gimbal 120 and the corresponding surfaces 154 or 354 on the other lateral side of gimbal 120).

This invention is not to be taken as limited to all of the details thereof as modifications and variations thereof may be made without departing from the spirit or scope of the invention. For example, and not by way of limitation, in certain designs, one or more of the limiters may be used to provide one or more contact surfaces or constraints against which the gimbal arm may be deformed in the practice of the present invention. As an even more specific example with respect to FIG. 22, limiter 44 may be used to provide the function of contact surface 50 in the practice of the present invention.

What is claimed is:

1. A method of adjusting a static attitude for a head suspension having a gimbal with at least one gimbal arm, the method comprising:
    a. contacting a first side of the at least one gimbal arm at a pair of spaced apart locations with a pair of first contacting surfaces;
    b. contacting a second side of the at least one gimbal arm at an intermediate location between the spaced apart locations with a second contacting surface; and
    c. plastically deforming the at least one gimbal arm by causing relative movement between the second and first contacting surfaces while maintaining a relative position between the pair of first contacting surfaces such that at least one of a pitch and roll parameter of the gimbal is adjusted to a desired amount.

2. The method of claim 1 wherein the at least one gimbal arm is a first gimbal arm and the gimbal has a second gimbal arm, the method further comprising:
    d. contacting a first side of the second gimbal arm at a pair of spaced apart locations with a pair of third contacting surfaces;
    e. contacting a second side of the second gimbal arm at an intermediate location between the spaced apart locations with a fourth contacting surface; and
    f. plastically deforming the second gimbal arm by causing relative movement between the third and fourth contacting surfaces while maintaining a relative position between the pair of third contacting surfaces such that at least one of a pitch and roll parameter of the gimbal is adjusted to a desired amount.

3. The method of claim 2 wherein the second gimbal arm is deformed after the first gimbal arm is deformed.

4. The method of claim 2 wherein the first and second gimbal arms are deformed at least partially concurrently.

5. The method of claim 1 wherein the head suspension has at least one limiter to limit the travel of the gimbal as a result of a shock load and step c. of the method is performed without impairing the operation of the limiter.

6. A method of adjusting a static attitude for a head suspension having a gimbal with first and second sides and with first and second gimbal arms, with each gimbal arm having a first side on the first side of the gimbal and each gimbal arm having a second side on the second side of the gimbal, the method comprising:
    a. contacting a second side of the first gimbal arm with a pair of first contacting surfaces at a pair of spaced apart locations;
    b. contacting a first side of the first gimbal arm with a second contacting surface at an intermediate location between the spaced apart locations of the first contacting surfaces;
    c. contacting a first side of the second gimbal arm with a pair of third contacting surfaces at a pair of spaced apart locations;
    d. contacting a second side of the first gimbal arm with a fourth contacting surface at an intermediate location between the spaced apart locations of the fourth contacting surfaces; and
    e. plastically deforming at least one of the first and second gimbal arms by causing relative movement between the contacting surfaces on opposite sides of at least one of the gimbal arms such that at least one of a pitch and roll parameter of the gimbal is adjusted to a desired amount.

7. The method of claim 6 wherein the head suspension has at least one limiter to limit the travel of the gimbal as a result of a shock load and step e. of the method is performed without impairing the operation of the limiter.

8. A method of adjusting a static attitude for a head suspension having a gimbal formed by a tongue positioned between a pair of laterally spaced and longitudinally extending first and second gimbal arms, and wherein the gimbal has a dimple contact at the tongue, the method comprising:
    a. contacting a first side of the first gimbal arm with a first contacting surface and contacting the first side of the second gimbal arm with a second contacting surface, with the first and second contacting surfaces located on the same side of the gimbal as the dimple contact and with the first contacting surface and the dimple contact forming a first spaced apart set of contacts and the second contacting surface and the dimple contact forming a second spaced apart set of contacts;
    b. contacting a second side of the first and second gimbal arms with a pair of third contacting surfaces, each positioned at one of a pair of intermediate locations within the first and second sets of contacts; and
    c. plastically deforming at least one of the gimbal arms by causing relative movement between the third contacting surfaces and its respective set of contacts.

9. The method of claim 8 wherein step c. further comprises adjusting a pitch parameter of the static attitude for the head suspension.

10. The method of claim 8 wherein step c. further comprises adjusting a roll parameter of the static attitude for the head suspension.

11. The method of claim 8 wherein step c. further comprises plastically deforming each of the gimbal arms.

12. The method of claim 8 wherein the head suspension has at least one limiter to limit the travel of the gimbal as a result of a shock load and step c. of the method is performed without impairing the operation of the limiter.

* * * * *